US008634162B2

(12) United States Patent
Bonhote et al.

(10) Patent No.: US 8,634,162 B2
(45) Date of Patent: Jan. 21, 2014

(54) PERPENDICULAR WRITE HEAD HAVING A STEPPED FLARE STRUCTURE AND METHOD OF MANUFACTURE THEREOF

(75) Inventors: Christian Rene Bonhote, San Jose, CA (US); Thomas Dudley Boone, Jr., San Jose, CA (US); Quang Le, San Jose, CA (US); Jui-Lung Li, San Jose, CA (US); Jeffrey S. Lille, Sunnyvale, CA (US); Scott Arthur MacDonald, San Jose, CA (US); Neil Leslie Robertson, Palo Alto, CA (US); Xhavin Sinha, New Westminister (CA); Petrus Antonius Van Der Heijden, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 1071 days.

(21) Appl. No.: 11/683,972

(22) Filed: Mar. 8, 2007

(65) Prior Publication Data
US 2008/0232001 A1 Sep. 25, 2008

(51) Int. Cl.
*G11B 5/147* (2006.01)
(52) U.S. Cl.
USPC ............ 360/125.02; 360/125.03; 360/125.12; 360/319
(58) Field of Classification Search
USPC ............ 360/125.02–125.03, 125.04, 125.06, 360/125.07, 125.08, 125.12, 125.13, 360/125.24, 125.3, 125.33, 125.62, 126
See application file for complete search history.

(56) References Cited

U.S. PATENT DOCUMENTS

| 4,799,118 | A | 1/1989 | Yamada et al. ............... 360/125 |
| 5,075,956 | A | 12/1991 | Das ................................. 29/603 |
| 6,693,768 | B1 | 2/2004 | Crue et al. |
| 6,697,221 | B2 | 2/2004 | Sato et al. |
| 6,738,222 | B2 | 5/2004 | Sato et al. ..................... 360/126 |
| 6,922,316 | B2 * | 7/2005 | Sato et al. ..................... 360/317 |
| 6,954,340 | B2 | 10/2005 | Shukh et al. .................. 360/317 |
| 7,126,788 | B1 * | 10/2006 | Liu et al. .................. 360/125.53 |

(Continued)

FOREIGN PATENT DOCUMENTS

| JP | 60163221 | 8/1985 | ............. G11B 5/127 |
| JP | 3209609 | 9/1991 | ............... G11B 5/31 |

OTHER PUBLICATIONS

Restriction Requirement from U.S. Appl. No. 12/646,884 dated Oct. 18, 2011.

(Continued)

*Primary Examiner* — Will J Klimowicz
*Assistant Examiner* — Carlos E Garcia
(74) *Attorney, Agent, or Firm* — Zilka-Kotab, PC

(57) ABSTRACT

A magnetic write head for data recording having a magnetic write pole with a stepped magnetic shell structure that defines a secondary flare point. The secondary flare point defined by the magnetic shell portion can be more tightly controlled with respect to its distance from the air bearing surface (ABS) of the write head than can a traditional flare point that is photolithographically on the main pole structure. This allows the effective flare point of the write head to be moved much closer to the ABS than would otherwise be possible using currently available tooling and photolithography techniques. The write head may also include a magnetic trailing shield that wraps around the main pole portion. The trailing shield can have a hack edge defining a trailing shield throat height that is either between the secondary flare point or coincident or behind the secondary flare point, depending on design requirements.

14 Claims, 57 Drawing Sheets

(56) References Cited

U.S. PATENT DOCUMENTS

| | | | |
|---|---|---|---|
| 7,443,633 B2* | 10/2008 | Tagami et al. | 360/125.5 |
| 2002/0060880 A1 | 5/2002 | Kawabe et al. | |
| 2003/0179497 A1 | 9/2003 | Harris, III et al. | 360/126 |
| 2004/0037002 A1 | 2/2004 | Kudo et al. | 360/126 |
| 2004/0175942 A1 | 9/2004 | Chang et al. | 438/689 |
| 2005/0018348 A1 | 1/2005 | Lille et al. | 360/125 |
| 2005/0024766 A1 | 2/2005 | Khera et al. | 360/125 |
| 2005/0024779 A1 | 2/2005 | Le et al. | 360/317 |
| 2005/0057852 A1 | 3/2005 | Yazawa et al. | 360/125 |
| 2005/0068665 A1 | 3/2005 | Le et al. | 360/97.01 |
| 2005/0068678 A1 | 3/2005 | Hsu et al. | 360/126 |
| 2005/0105214 A1 | 5/2005 | Im et al. | 360/125 |
| 2005/0128637 A1* | 6/2005 | Johnston et al. | 360/125 |
| 2005/0141137 A1 | 6/2005 | Okada et al. | 360/122 |
| 2005/0157424 A1 | 7/2005 | Kuroda et al. | 360/125 |
| 2005/0190491 A1 | 9/2005 | Le et al. | 360/122 |
| 2005/0201011 A1 | 9/2005 | Dill et al. | 360/126 |
| 2005/0219747 A1 | 10/2005 | Hsu et al. | 360/126 |
| 2005/0219764 A1 | 10/2005 | Kameda et al. | 360/313 |
| 2005/0271904 A1 | 12/2005 | Li et al. | |
| 2005/0280936 A1* | 12/2005 | Sasaki et al. | 360/126 |
| 2005/0280938 A1 | 12/2005 | Sasaki et al. | 360/126 |
| 2005/0280939 A1 | 12/2005 | Sasaki et al. | 360/126 |
| 2006/0000794 A1 | 1/2006 | Le | 216/22 |
| 2006/0002014 A1* | 1/2006 | Sasaki et al. | 360/125 |
| 2006/0002019 A1 | 1/2006 | Guthrie et al. | 360/125 |
| 2006/0087765 A1* | 4/2006 | Iwakura et al. | 360/125 |
| 2006/0092564 A1* | 5/2006 | Le | 360/126 |
| 2006/0171068 A1* | 8/2006 | Taguchi | 360/125 |
| 2008/0088972 A1* | 4/2008 | Sasaki et al. | 360/110 |

OTHER PUBLICATIONS

Restriction Requirement from U.S. Appl. No. 12/646,858 dated Dec. 28, 2011.
Restriction Requirement from U.S. Appl. No. 12/646,879 dated Nov. 15, 2011.
Non-Final Office Action Summary from U.S. Appl. No. 12/646,884 dated Dec. 20, 2011.
Non-Final Office Action Summary from U.S. Appl. No. 12/646,879 mailed Mar. 9, 2012.
Notice of Allowance and Fee(s) Due from U.S. Appl. No. 12/646,884 mailed Mar. 21, 2012.
Non-Final Office Action Summary from U.S. Appl. No. 12/646,858 mailed May 31, 2012.
Final Office Action Summary from U.S. Appl. No. 12/646,858 dated Jan. 25, 2013.
Final Office Action Summary from U.S. Appl. No. 12/646,879 dated Oct. 3, 2012.
Final Office Action from U.S. Appl. No. 12/646,858 dated Nov. 19, 2013.
Non-Final Office Action from U.S. Appl. No. 12/646,879 dated Nov. 18, 2013.

* cited by examiner

PERPENDICULAR WRITE HEAD HAVING A STEPPED FLARE STRUCTURE AND METHOD OF MANUFACTURE THEREOF

FIELD OF THE INVENTION

The present invention relates to the construction of perpendicular magnetic write heads and more particularly to the use of an optical lapping guide for accurately defining the write pole flare point of a perpendicular magnetic write head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally has included a coil layer embedded in one or more insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In current read head designs a spin valve sensor, also referred to as a giant magnetoresistive (GMR) sensor, is employed for sensing magnetic fields from the rotating magnetic disk. The sensor includes a nonmagnetic conductive layer, hereinafter referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer. The thickness of the spacer layer is chosen to be less than the mean free path of conduction electrons through the sensor. With this arrangement, a portion of the conduction electrons is scattered by the interfaces of the spacer layer with each of the pinned and free layers.

When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

Recently, researchers have focused on the development of perpendicular magnetic recording systems in order to increase the data density of a recording system. Such perpendicular recording systems record magnetic bits of data in a direction that is generally perpendicular to the surface of the magnetic medium. A write head used in such a system generally includes a write pole having a relatively small cross section at the air bearing surface (ABS) and a return pole having a larger cross section at the ABS. A magnetic write coil induces a magnetic flux to be emitted from the write pole in a direction generally perpendicular to the plane of the magnetic medium. This flux returns to the write head at the return pole where it is sufficiently spread out and weak that it does not erase the signal written by the write pole.

The write pole typically has a flare point that is recessed a desired distance from the ABS. This flare point distance is a critical dimension that must be carefully controlled. The write head may also include a trailing magnetic shield that can be used to increase the field gradient and increase the write speed. The trailing shield has a thickness as measured from the ABS that defines a throat height of the trailing shield. The throat height of the trailing shield is another critical dimension that also must be carefully controlled.

However, as the size of magnetic heads decreases, variations in currently available tooling and photolithography processes make it impossible to control the flare point and trailing shield throat height with sufficient accuracy. Therefore, the inability to accurately control the flare point and trailing shield throat height is limiting the ability to further shrink write head sizes, and is therefore limiting any increase in data capacity.

Therefore, there is a strong felt need for a structure or process that can very accurately define and control the flare point of a write head and the throat height of a magnetic shield in a magnetic write head. Such a structure or process must also be manufacturable using currently available tooling and processes.

SUMMARY OF THE INVENTION

The present invention provides a magnetic write head having a secondary flare point that can be very tightly controlled at very small sizes. The magnetic write head includes a magnetic write pole having a magnetic core portion, and a magnetic shell portion formed thereover. The magnetic shell portion has an end surface that forms a stepped feature that defines a secondary flare point.

This secondary flare point can be closer to the air bearing surface ABS, than the flare point formed on the magnetic core portion and the location of this secondary flare point can be very accurately defined and controlled relative to the ABS.

The magnetic write head can be constructed by forming a magnetic write pole on a substrate. Then, a mask, such as a photoresist mask can be formed over a portion of the write pole, the mask having a back edge at a location where the secondary flare point is desired. A magnetic metal can then be plated onto the magnetic write head, forming a magnetic write head with a core portion that extends to the ABS and a magnetic shell portion (plated over the core portion) that forms a stepped feature, recessed from the ABS to define a secondary flare point.

The magnetic write head can also include a trailing magnetic shield that can be formed by depositing a non-magnetic gap material over the write pole and then depositing a magnetic material to form a trailing shield, with a back edge that is separated from the magnetic shell portion by the non-magnetic gap material.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
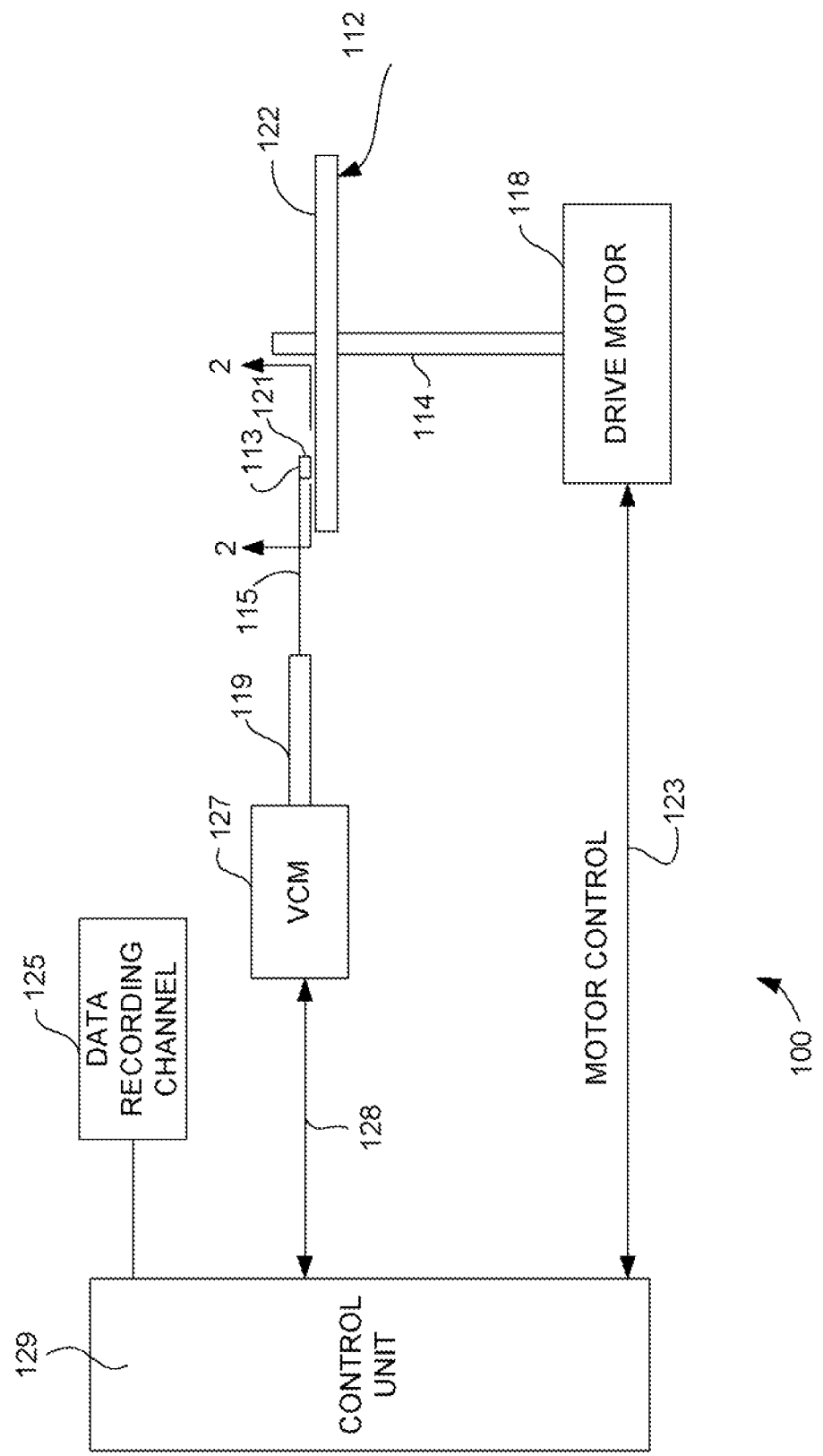
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
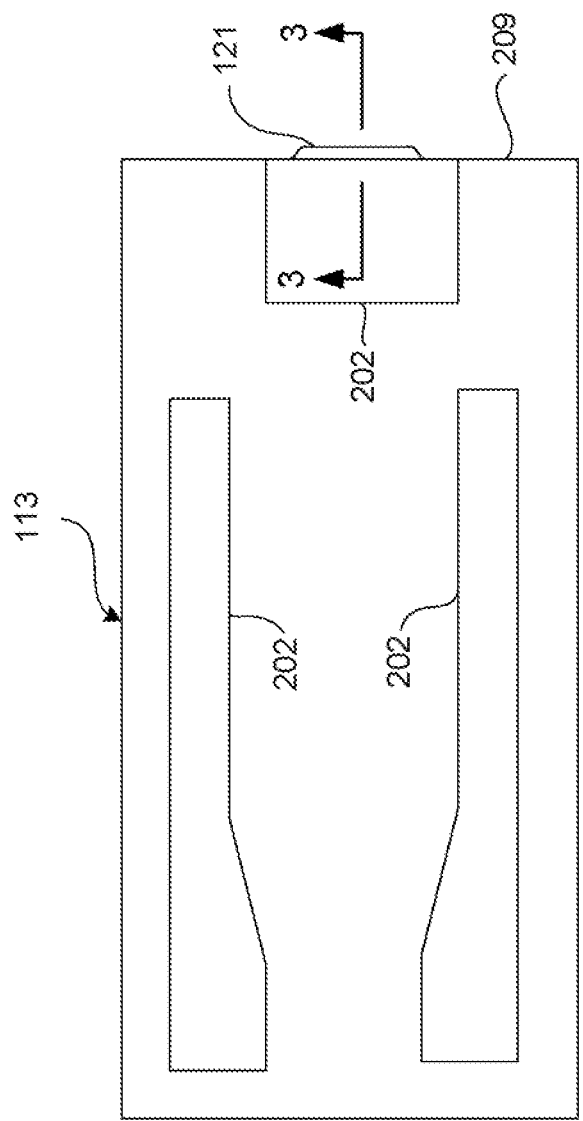
FIG. 2 is an ABS view of a slider, taken from line 2-2 of FIG. 3, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider 209. The ABS plane of the slider may include pads or recessions 202 relative to the ABS plane of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
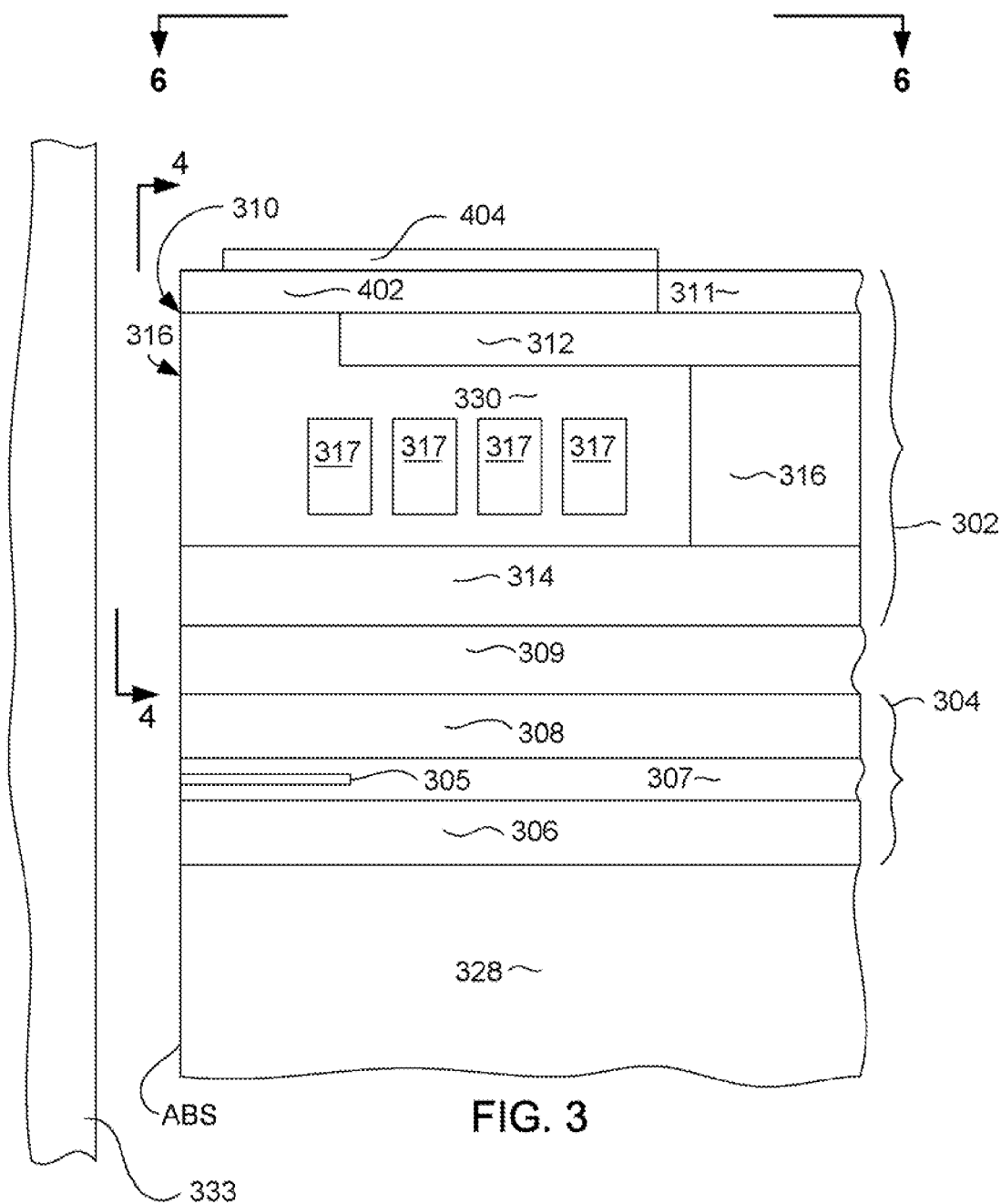
FIG. 3 is a cross sectional view of a magnetic head taken from line 3-3 of FIG. 2, enlarged, and rotated 90 degrees counterclockwise illustrating an embodiment of the invention incorporated into a perpendicular magnetic write head.

With reference now to FIG. 3, the magnetic head 121 for use in a perpendicular magnetic recording system is described. The head 121 includes a write element 302 and a read element 304. The read element 304 includes a magnetoresistive read sensor 305. The sensor 305, could be, for example, a current in plane giant magnetoresistive sensor (CIP GMR), a current perpendicular to plane giant magnetoresistive sensor (CPP GMR) or a tunnel junction sensor (TMR). The sensor 305 is located between first and second magnetic shields 306, 308 and embedded in a dielectric material 307. The magnetic shields 306, 308, which can be constructed of for example CoFe, NiFe or sendust, absorb magnetic fields, such as those from up-track or down-track data signals, ensuring that the read sensor 305 only detects the desired data track, located between the shields 306, 308. A non-magnetic, gap layer 309 may be provided between the shield 308 and the write head 302. If the sensor 305 is a CIP GMR sensor, then the sensor will be insulated from the shields 306, 308 as shown in FIG. 3. However, if the sensor 305 is a CPP GMR sensor or TMR sensor, then, the top and bottom of the sensor 305 can contact the shields 306, 308 so that the shields can act as electrically conductive leads for supplying a sense current to the sensor 305.

With continued reference to FIG. 3, the write element 302 includes a write pole 310 that is magnetically connected with a magnetic shaping layer 312, and is embedded within a non-magnetic material 311. The write pole 310 has a small cross section at the air bearing surface and is constructed of a magnetic material. The write head 302 also includes a return pole 314 that is constructed of a magnetic material such as CoFe, NiFe, or their alloys and has a cross section parallel to the ABS surface that is significantly larger than that of write pole 310. The return pole 314 can be magnetically connected with the shaping layer 312 and write pole 310 by a back gap portion 316 as shown in FIG. 3. The return pole 314 and back gap 316 can be constructed of, for example, NiFe, CoFe, or their alloys or some other magnetic material.

An electrically conductive write coil 317, shown in cross section in FIG. 3, passes through the write element 302 between the pole layer 402, and the return pole 314. The coil 317 is embedded in an insulation layer 330 that can be, for example, alumina and can include one or more layers of one or more materials.

When a current passes through the coil 317, the resulting magnetic field causes a magnetic flux to flow through the pole layer 402, return pole 314, back gap 316, shaping layer 312 and write pole 310 and possibly some magnetic material in the adjacent media 333. This magnetic, flux causes a write field to be emitted toward an adjacent magnetic medium 333. This magnetic field emitted from the write pole 310 magnetizes a relatively higher coercivity, thin top magnetic layer on the magnetic medium 333. This magnetic field travels through a magnetically soft underlayer of the magnetic medium to the return pole 314, where it is sufficiently spread out that it does not erase data elsewhere on the media 333 that is not located directly under the write pole 310.

Figure 4:
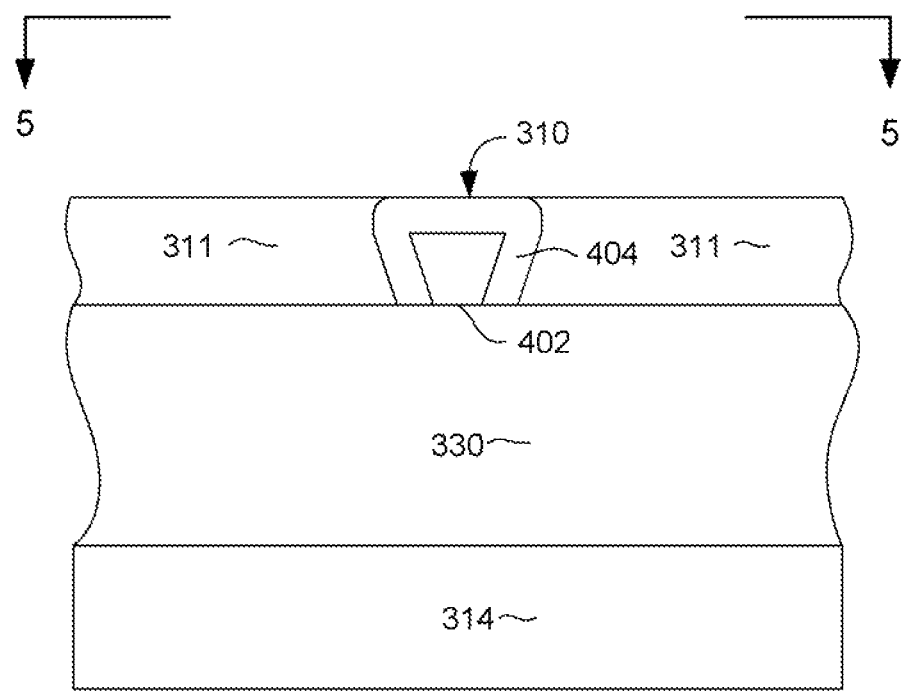
FIG. 4 is an ABS view taken from line 4-4 of FIG. 3 of a write head.

With reference to FIG. 4, which shows an ABS view of the write element 302, it can be seen that the write pole 310 preferably has a trapezoidal shape. This shape helps to reduce skew related adjacent track interference. Although not shown, the trailing shield could be constructed to wrap around the sides of the write pole 310, in which case the side portions of the trailing shield would be separated from the sides of the write pole 310 by a non-magnetic side gap material.

Figure 5:
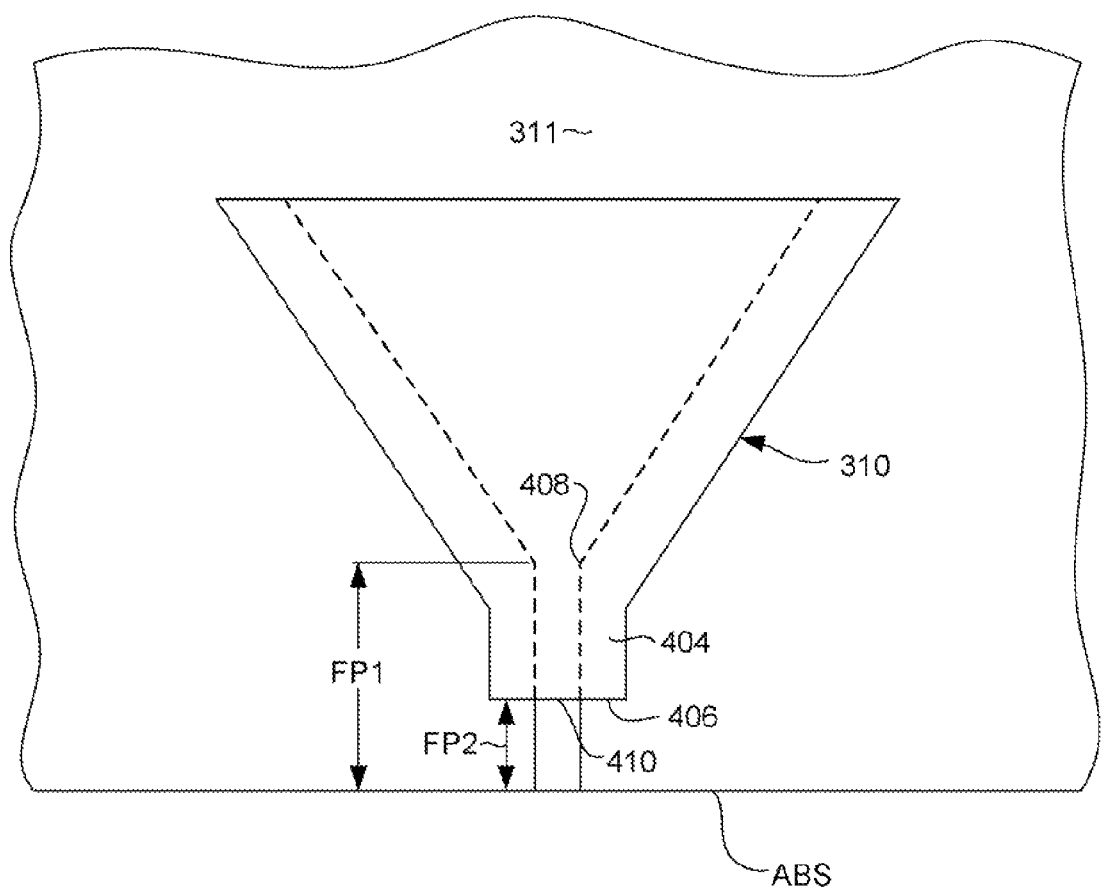
FIG. 5 is a top down view taken from line 5-5 of FIG. 4.

With reference to FIGS. 3, 4 and 5, it can be seen that the write pole 310 has a stepped flare structure. More particularly, the write pole 310 includes a magnetic core 402 that is preferably constructed of a lamination of magnetic layers such as NiFe or CoFe separated by thin non-magnetic layers such as alumina. Other materials that can be used in such a laminated write pole include silica, Ta, Ti, NiP, Pd, si, Cr, Mo, Rh, Ru and Al. The write pole 310 also includes a magnetic shell portion 404, constructed of an electroplated magnetic material such as NiFe, CoFe, or their alloys that wraps around the magnetic core 402. With reference to FIG. 4, it can be seen that the magnetic shell 404 is laterally symmetrical about the core 402. By laterally symmetrical, it is meant that the shell 404 is symmetrical in the track width direction, to the left and right as shown in FIG. 4.

With reference to FIG. 5, which shows a view of the deposited end of the slider, it can be seen that the shell 404 forms a stepped structure 406 that is recessed from the ABS. In FIG. 5, the portions of the core 402 that are hidden within the shell 404 are shown in dashed line, and as can be seen, the core 402 has a flare point 408 that is recessed from the ABS by a first distance FP1. However, the stepped structure 406 formed by the front most edge (ABS facing edge 410) of the shell, defines a secondary flare point that is recessed by a distance FP2 from the ABS, FP2 being smaller than FP1.

As write heads become ever smaller, the flare point distance from the ABS must become smaller as well. However, available manufacturing processes such as photolithography have resolution and variation limitations that limit the size and placement to which the flare point distance can be defined. For example, currently available photolithographic processes have variations that are sufficiently great that for very small write pole sizes, the location of the flare point in a standard write pole would vary between a write pole having a flare point that is too large to a write pole having no flare point at all. A flare point that is too large would choke off the flux, significantly reducing the write field. A flare point that is too small (or even non-existent) results in an extremely wide write signal that writes to several adjacent tracks. Both of these situations are of course unacceptable. The secondary flare point 406 provided by the magnetic shell 404 allows the location of the flare point FP2 to be carefully controlled using currently available photolithographic tools and techniques, as will be described below.

The details of the electroplating bath and process are also relevant. The material that is electroplated should preferably be ferromagnetic, but could consist of more than one layer where one layer is ferromagnetic and another is non-ferromagnetic. An example of a non-magnetic layer could be NiP alloy or Pd alloy. Plating such an alloy is a balance between bath composition, plating area, current density and other factors. Other factors include anode and cathode material, voltage or current variations, bath composition including additives, surfactants, buffering, and complexing agents, plating cell design, bath temperature, plating flow rate, wafer mask design, and magnetic field.

In order to electroplate a thin magnetic layer, it is important to control the plating process. Therefore, the plating rate should preferably be less than 100 nm/min. The thin plated layer should be con formal and not introduce increased roughness or morphology to the surface. Preparation of the surface to plate a thin layer could include pre-wetting the surface or using surfactants in the bath. Additives can also be added that will slow the plating process in order to achieve improved thickness control. Another important factor in thin plating is the dwell time which is the amount of time that the wafer sits in the bath prior to applying a potential to the wafer. This dwell time should be minimized because the bath can actually etch or corrode the very material one would want to plate upon (ie. the anode).

A method for minimizing the dwell time in the plating bath is to have a voltage applied to the cathode or anode prior to placement in the plating bath. Therefore, once a wafer enters the plating bath, the circuit is complete and electroplating begins instantaneously. This is referred to hereinafter as a "hot start" process because the wafer can be "hot" by having a voltage on it outside the plating bath which is similar to a live, ungrounded wire.

Plating methods can also affect the material properties and its final thickness. One pulse plating method includes applying a series of voltage or current pulses that plate material in a non-continuous method. This will have the end result of having a slower average overall plating rate compared to the plating rate during a pulse. Reducing the pulse frequency or voltage can slow the plating process. One can even briefly reverse the potential on the wafer and etch (or de-plate) briefly to slow or alter the final plated film.

Figure 6:
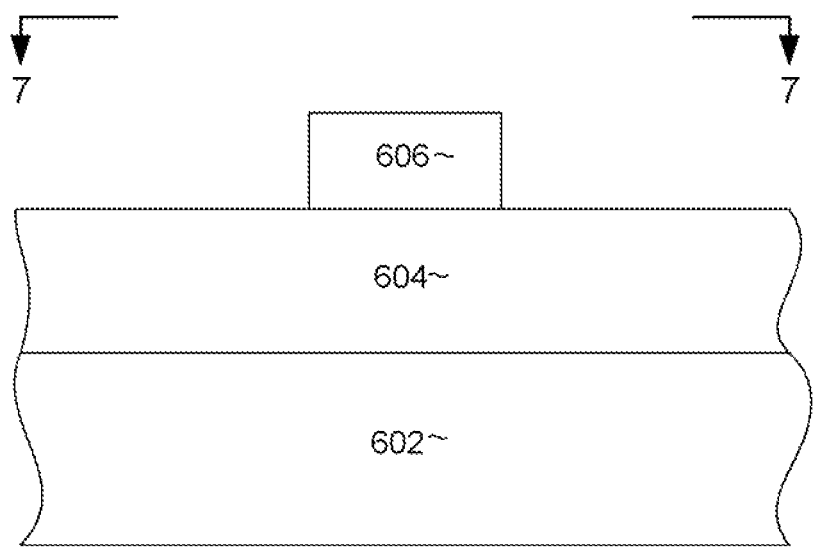
FIGS. 6-14 show a write head in various intermediate stages of manufacture illustrating a method of manufacturing a write head.
Figure 7:
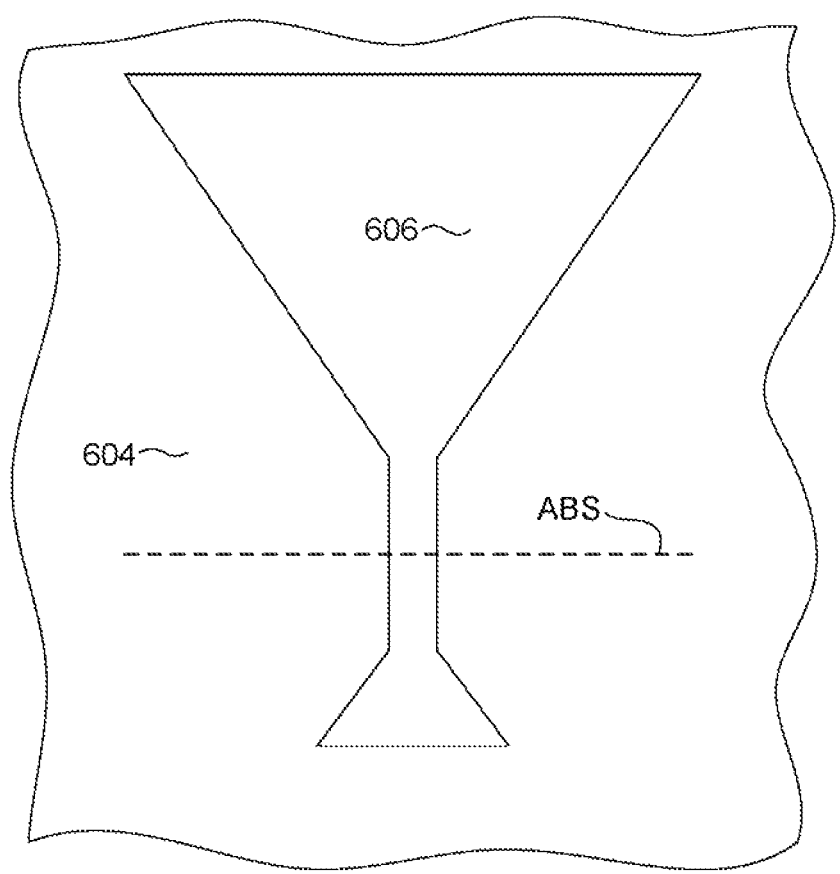

With reference now to FIGS. 6-14, a method for manufacturing a magnetic write head 302 such as that described above will be described. With particular reference to FIG. 6, a substrate or under-layer 602 is provided. The substrate 602 can be, for example, the fill layer 330 and shaping layer 312 described with reference to FIG. 3. Other structures or devices in a head may also be in or below the under-layer 602. The fill layer 330 can be constructed of alumina. A layer of magnetic pole material 604 is deposited over the substrate 602. The magnetic pole material 604 can be constructed of several materials, and is preferably a lamination of magnetic layers such as CoFe, NiFe, or their alloys separated by thin non-magnetic layers such as alumina, silicon dioxide or some other material. A mask structure 606 is formed over the magnetic layer 604. The mask structure can include various layers such as one or more hard mask, layers, one or more image transfer layer, and a mask material such as photoresist or thermal image resist. With reference to FIG. 7 it can be seen that the mask structure 606 is configured to define a write pole structure that extends beyond the plane of the Air Bearing Surface (ABS).

Figure 8:
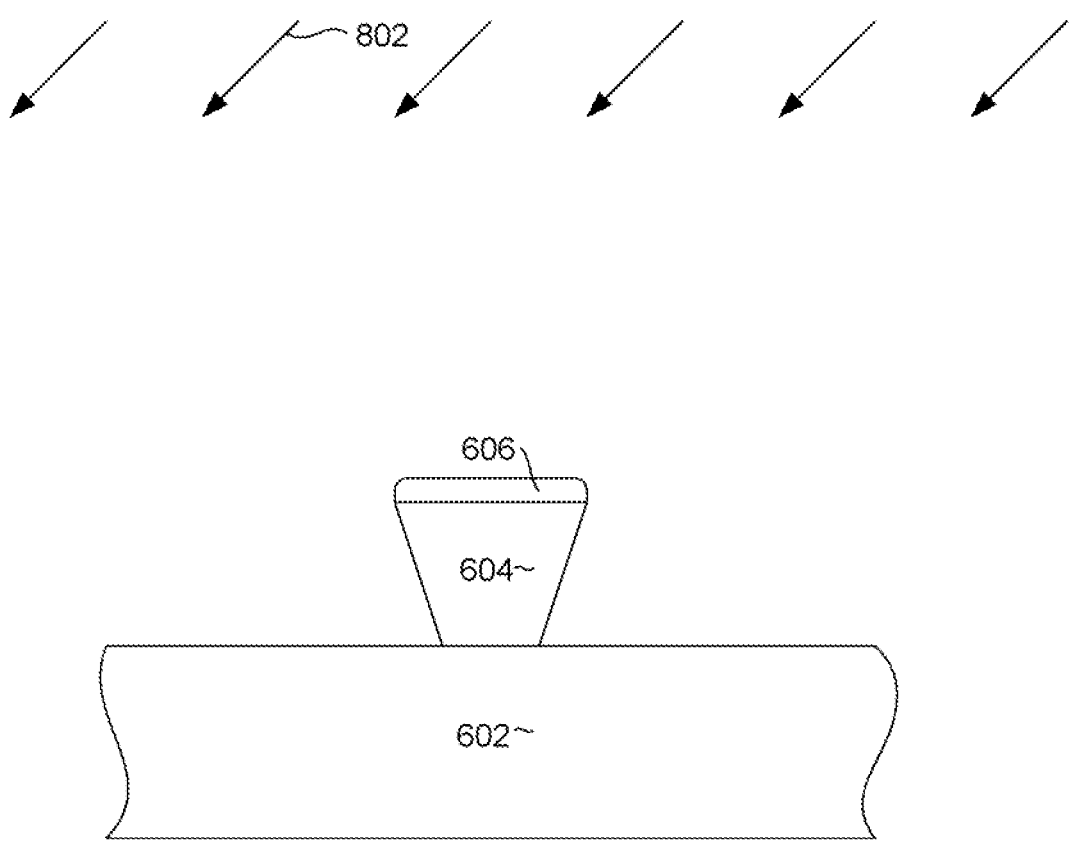
Figure 9:
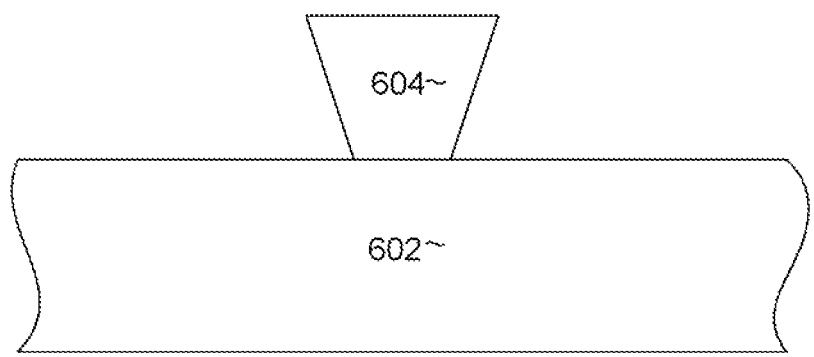
Figure 10:
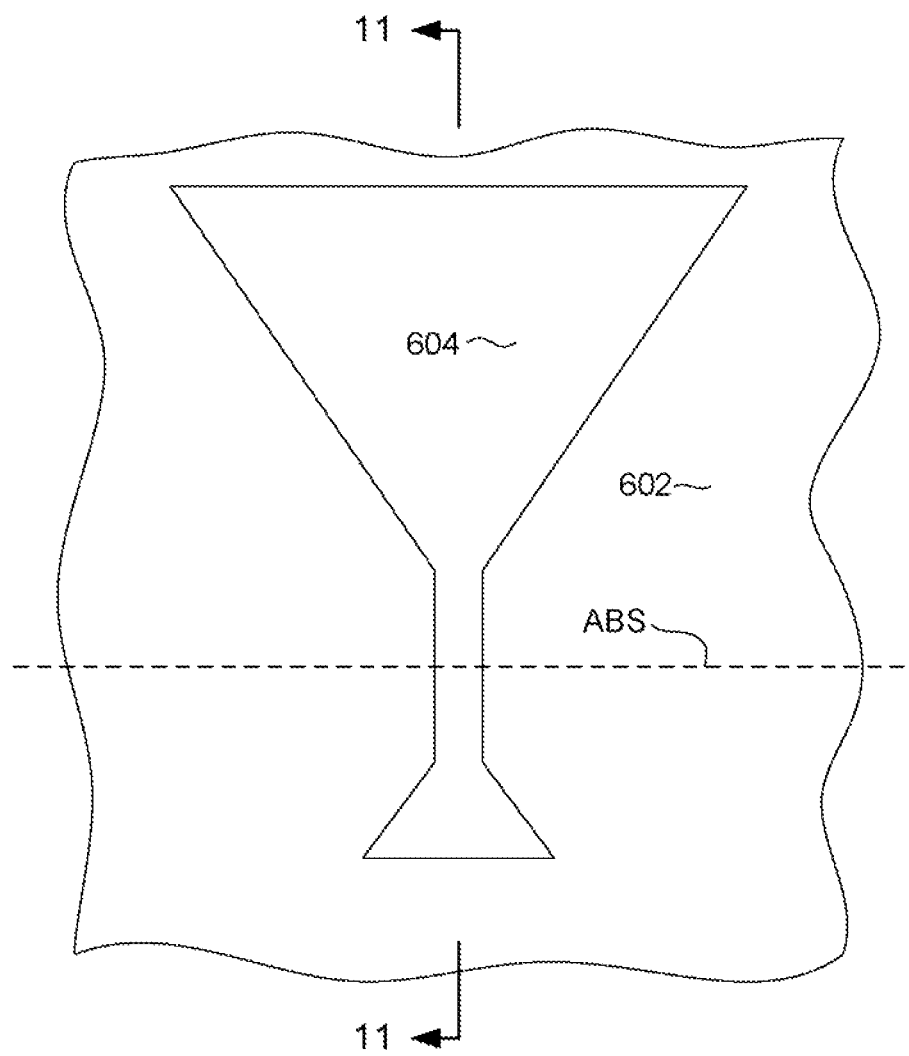

With reference now to FIG. 8, a material removal process such as ion milling, or some other process is performed to remove portions of the magnetic material 604 that are not protected by the mask structure 606 to form a write pole structure 604. The material removal process, represented by slanted arrows 802 can be performed, for example, by directing an ion beam at an angle or combination of angles relative to normal to form the write pole with a trapezoidal shape as shown in FIG. 8. With reference to FIG. 9, the remaining mask material 606 can be removed by one or more of various material removal processes, which may include reactive ion milling, reactive ion etching, etc. This results in a structure as shown in FIGS. 9 and 10 with a write pole structure 604 formed over the substrate 602. One should also note that the particular method of making the initial pole is not central to the structure or methods described herein. Alternatively, the pole 604 could be formed by electroplating and may be formed without non-magnetic lamination layers.

Figure 11:
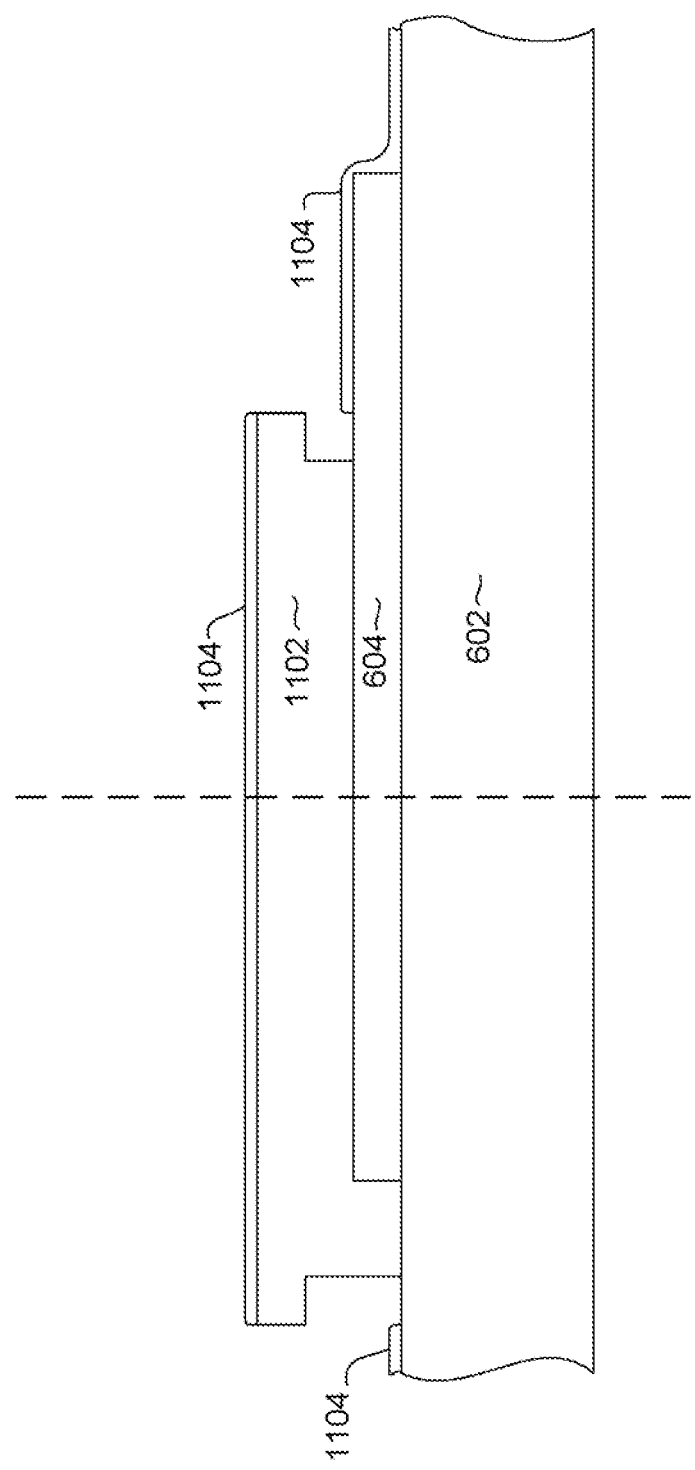
Figure 12:
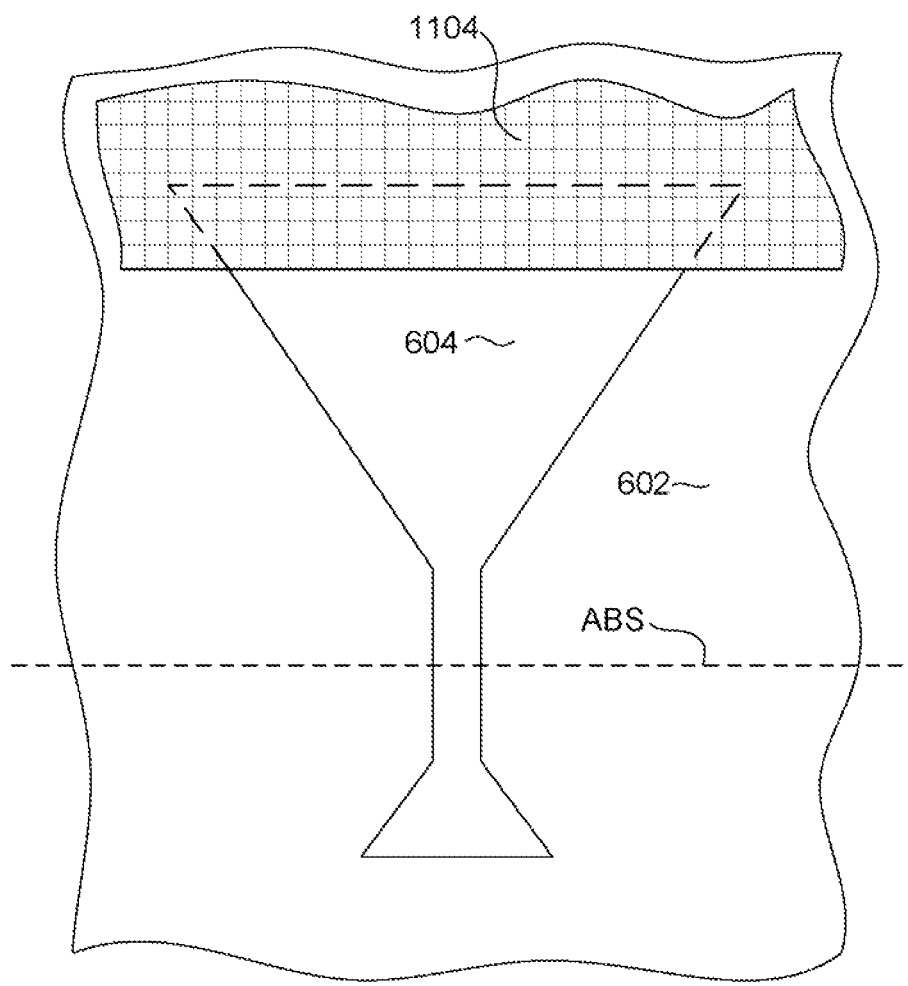

With reference now to FIG. 11, a liftoff process can be used to create a plating seed on a portion of the write pole. For example, a bi-layer photoresist mask 1102 can be formed to cover a majority of the write pole structure 604, leaving a portion of the write pole uncovered. Then, an electrically conductive, magnetic seed layer 1104 such as NiFe or Ta and/or Ir, Rh, etc. can be deposited such as by sputter deposition. The mask 604, can then be lifted off by a chemical liftoff process. The overhanging structure of the bi-layer mask facilitates the mask liftoff by allowing a liftoff chemical solution to reach under the edges of the mask 1102. The resulting seed layer 1104 covering a portion of the write pole 604 (preferably near the back edge of the write pole 604) can be seen with reference to FIG. 12. The portions of the write pole 604 that are hidden under the seed layer 1104 are shown in dashed line in the cross-hatched portion of FIG. 12. There would also, preferably, be seed 1104 deposited between devices as well.

Figure 13:
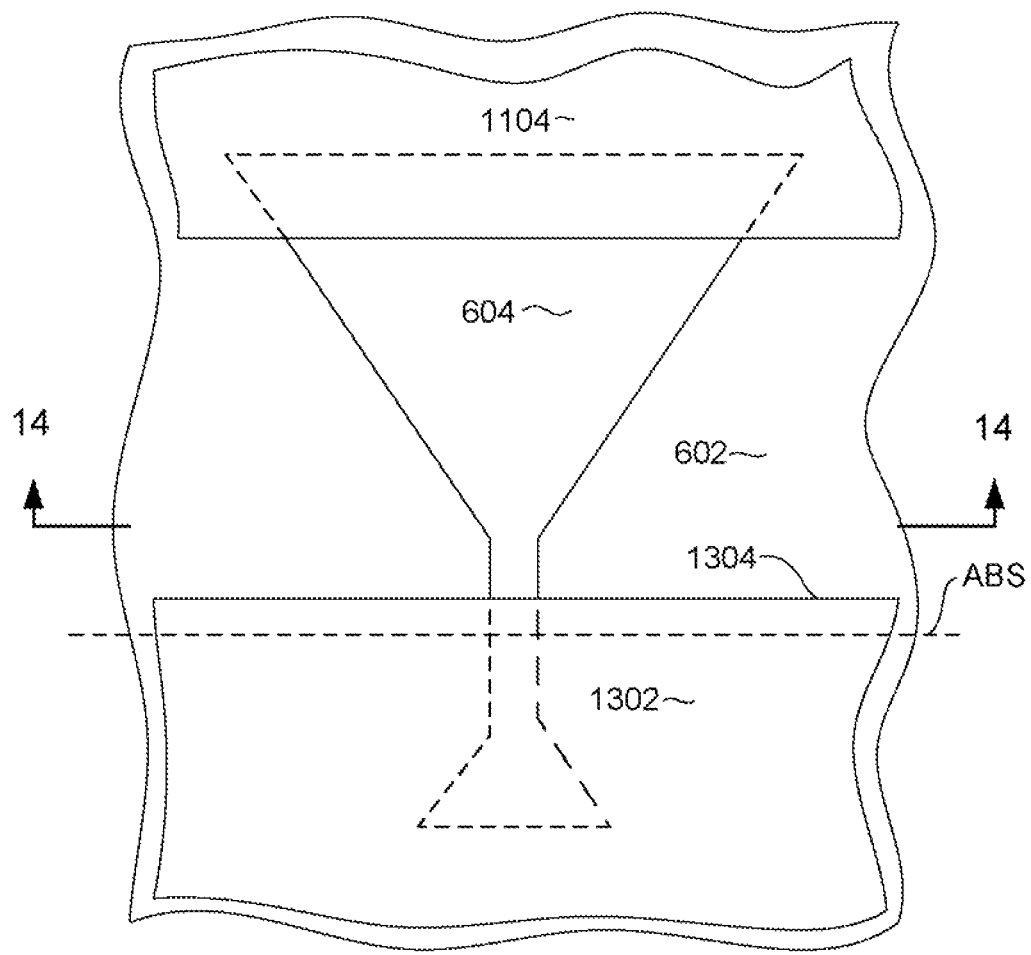

With reference now to FIG. 13, a mask structure, such as a photoresist mask 1302 is formed over a front portion of the write pole 604. As can be seen, the mask 1302 has a back edge 1304 that is located a desired distance behind the ABS plane designated (ABS). As will be seen, the location of this back edge 1304 determines the amount by which the secondary flare structure 406 (described with reference to FIG. 5) is recessed from the ABS. In other words, the location of the back edge 1304 determines the flare point (FP2) of the finished write head.

Figure 14:
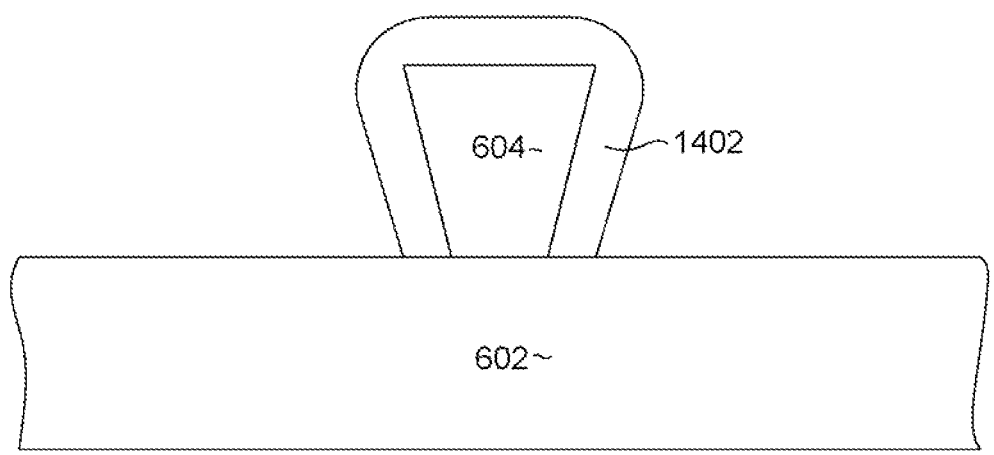

After, the mask 1302 has been formed, an electroplating process can be used to deposit an electrically conductive magnetic material such as NiFe, CoFe, or their alloys. This results in magnetic material being plated onto portions of the pole that are not covered by the mask 1302. With reference to FIG. 14, a cross section of a portion of the write pole 604 shows that the magnetic material 1402 is plated evenly over the write pole 604. Therefore, the electroplating results in a laterally symmetrical deposition of magnetic material 1402 onto the portions of the write pole 604 that are not covered by the mask 1302 (FIG. 13). By laterally symmetrical, it is meant that the deposition of magnetic material 1402 is symmetrical in a track width direction (ie. to the right and left and above as shown in FIG. 14).

The above described process results in a write pole structure such as the write pole 310 described with reference to FIGS. 3-5 above. As will be appreciated by those skilled in the art, inherent process limitations such as photolithographic variation, limit the amount by which the flare point distance can be reduced in a very small write head using a standard write pole structure and standard processes. The above described process makes it possible to construct a write pole having very reduced effective flare point (ie. flare point 406 in FIG. 5) using currently available manufacturing processes, and currently available photolithographic, tools. The present invention, therefore, allows the reduction of write head sizes for current and future write head fabrication.

Figure 15:
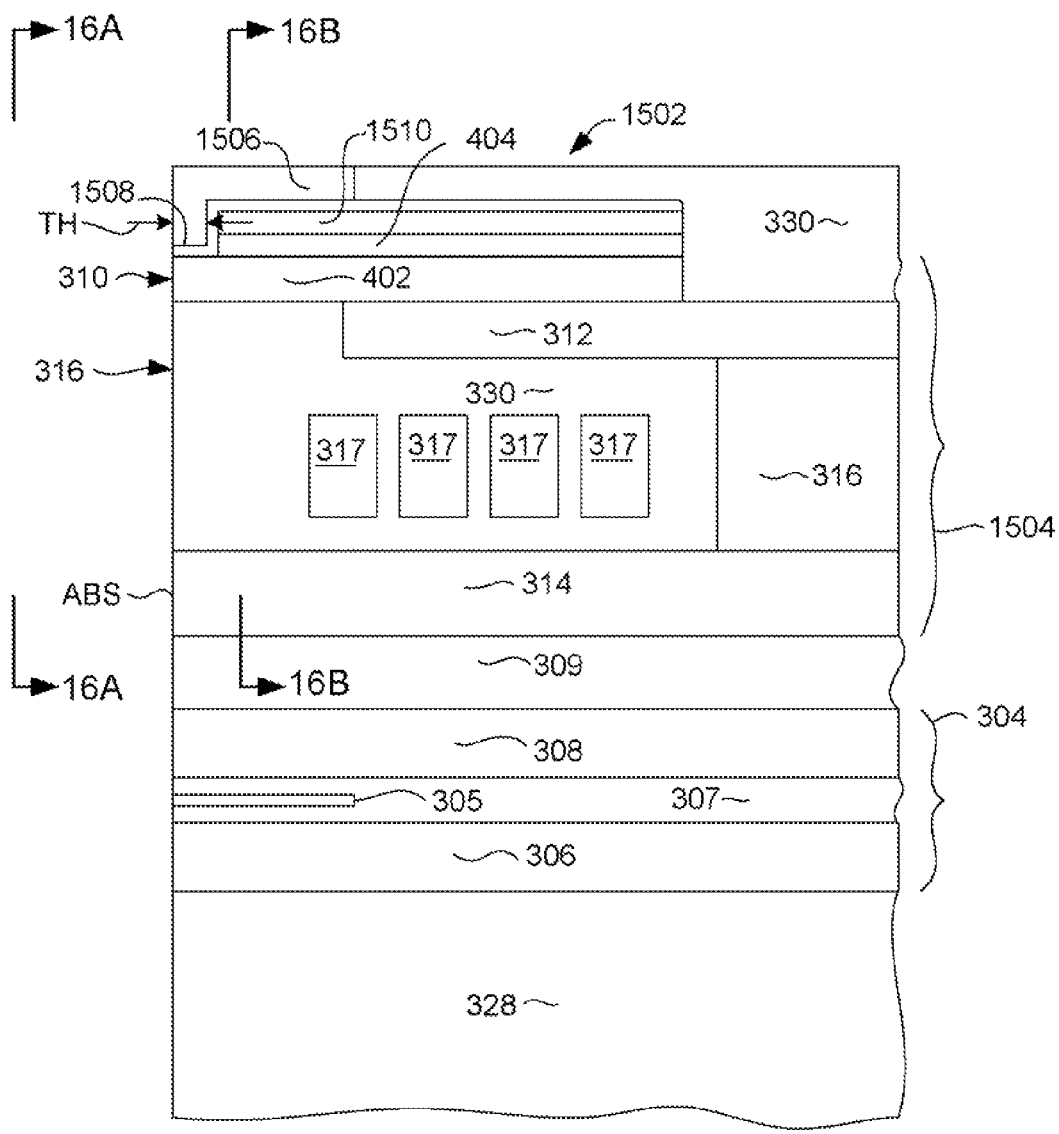
FIG. 15 is a side cross sectional view of a magnetic head according to an alternate embodiment of the invention.

Sacrificial Fill Layer:

The above described method for manufacturing a write head included a method of forming a write pole having a secondary flare point (FP2) formed by electroplating a stepped structure over a write pole. With reference now to FIGS. 15 and 16 a write head is described that has a stepped secondary notch structure similar to that described above, but which also has a wrap around trailing shield. With particular reference to FIG. 15 a magnetic read/write head 1502 according to an embodiment of the invention has a write head 1504 that has a trailing shield 1506 constructed to wrap around the sides of the write pole 310 and constructed of a magnetic material such as CoFe, NiFe, or their alloys. The trailing shield 1506 is separated from the write pole 310 by a non-magnetic gap material 1508 such as alumina ($Al_2O_3$) and/or Ta/Rh, Ta/Ir, or Au. The trailing shield has a throat height (TH) that is measured from the ABS to its back edge adjacent to the end of the magnetic shell portion 1510.

The write head 1504 includes a write pole 310 similar to that described above, which includes a magnetic shell stepped structure 404 that wraps around the top and sides of the main pole portion 402 as seen in FIG. 6B at a location recessed from the ABS. A non-magnetic spacer layer 1510 wraps around the top and sides of the stepped magnetic structure 404 as can also be seen in FIG. 16B. The non-magnetic spacer can be constructed of an electroplatable, non-magnetic material, such as NiP, and as can be seen in FIG. 16B, both the magnetic step structure 404 and the non-magnetic spacer 1510 are laterally symmetrical at either side of the main write pole portion 402.

Figure 16A:
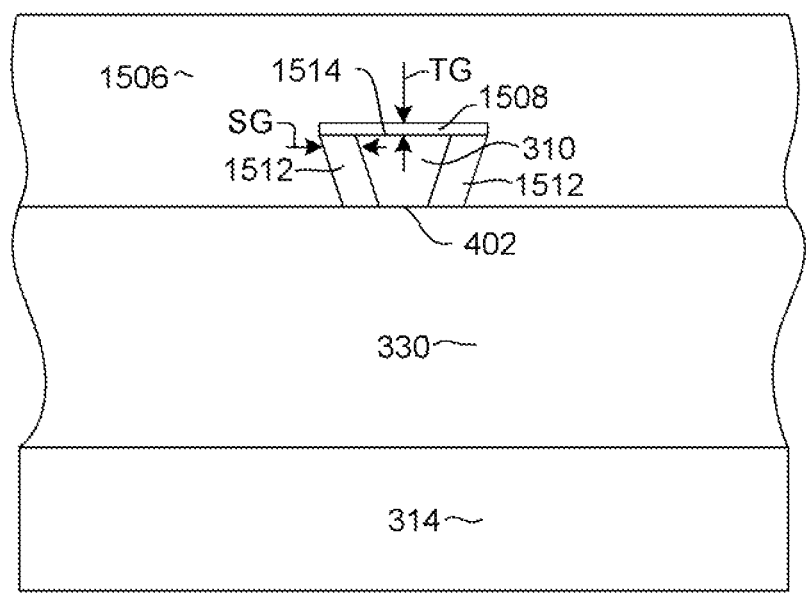
FIG. 16A is an ABS view taken from line 16A-16A of FIG. 15.
Figure 16B:
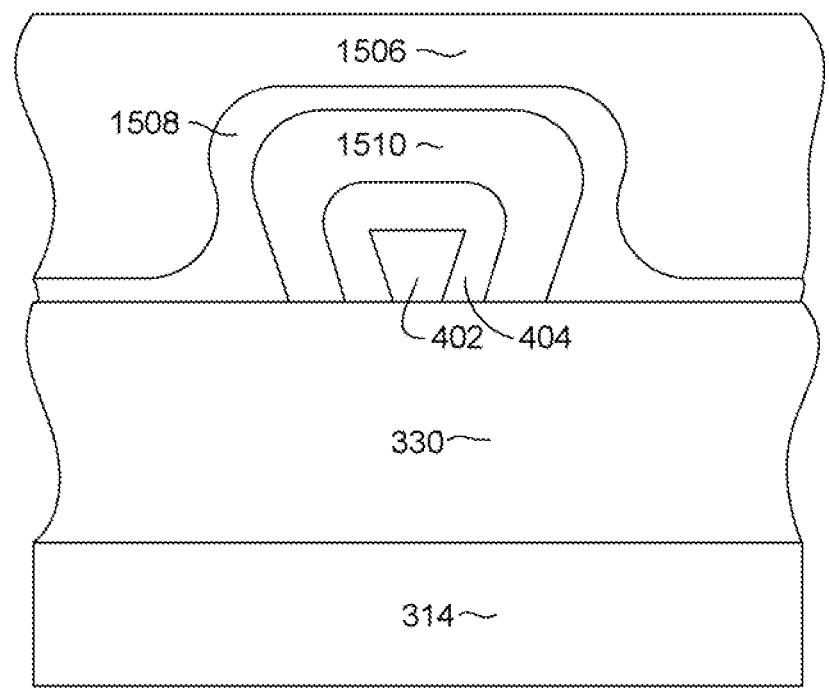
FIG. 16B is a cross sectional view taken from line 16B-16B of FIG. 15.

With reference now to FIG. 16A, it can be seen that the trailing shield wraps around the sides of the write pole 310, the sides of the write pole 310 being separated from the trailing shield 1506 by non-magnetic side gap layers 1512, which may be the same material as the trailing gap 1508 (such as alumina and/or Ta/Rh, Ta/Ir, or Au) or could be some other material. The trailing edge 1514 of the write pole 310 is separated from the trailing shield 1506 by a trailing gap distance (TG), and the sides of the write pole 310 are separated from the wrap around portions of the trailing shield by a side gap (SG). SG and TG can be different from one another, with the side gap SG being preferably (but not necessarily) larger than the trailing gap TG.

With reference again to FIG. 15, it can be seen, that the trailing shield 1506 can be magnetically connected to the return pole 314 or an additional pole that has the same magnetic state as the return pole 314. Alternatively, the trailing shield 1506 can be a floating shield that is not magnetically connected to the other magnetic structures of the write head 1504.

Figure 17:
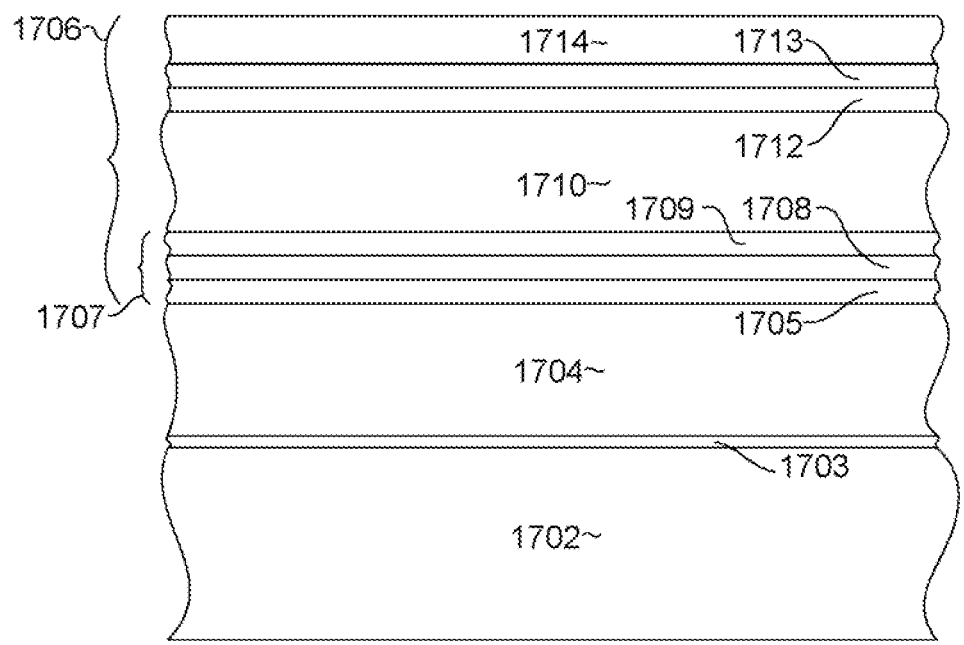
FIGS. 17-30 are views of a write head in various intermediate stages of manufacture illustrating a method of manufacturing a magnetic write head according to an alternate embodiment of the invention.

With reference now to FIGS. 17-30 a possible method is described for constructing a write head such as the write head 1504 described above. With particular reference to FIG. 17, a substrate 1702 is provided. The substrate 1702 can include an underlying non-magnetic, electrically insulating material such as 330 such as alumina and may include all or a portion of the shaping layer 312, both of which are described above with reference to FIG. 15. Optionally a non-magnetic under-layer material 1703 such as TaOx can be deposited over the substrate 1702. The under-layer 1703 can be helpful in reducing undercut of the write pole during fabrication as will be described in greater detail herein below. A magnetic write pole material 1704 is deposited over the substrate 1702, and over the under-layer 1703 if present. The write pole layer 1704 can be constructed of several magnetic materials, such as NiFe, CoFe, or their alloys but is preferably a laminated structure that includes layers of a magnetic material such as CoFe separated by thin non-magnetic layers such as alumina.

One or more masking layers 1706 are deposited over the write pole material layer 1704. Although the mask 1706 can include various configurations and material combinations, the mask 1706 preferably includes a hard mask structure 1707 formed over the write pole material 1704 and resist such as photoresist or thermal image resist 1714. The hard mask structure 1707 can be a tri-layer first hard mask structure, having a first layer 1705 a second layer 1708 and a third layer 1709. The first layer is preferably a material that is resistant to removal by chemical mechanical polishing (CMP) such as DLC (diamond-like carbon), Ta Rh, Ir, Ru, Cr or their combination. The second layer 1708 is preferably a material that is resistant to ion milling, such as alumina ($Al_2O_3$) and can have a thickness of about 20 nm. The third layer 1709 of the first hard mask structure 1707 is also preferably resistant to ion milling and is preferably constructed of AlTiO or Al containing alloy, and can have a thickness of about 50 nm.

A method used to create the pole can be one in which the mask 1707 becomes part of the non-magnetic trailing gap (TG) 1709 and is used as an endpoint detection layer during ion milling to define, in part, the non-magnetic side gap (SG) and removes the transfer mask 1710. In this case, the mill resistant material chosen for 1708 should have a bulk material of 1709 with a small percentage of doped material for endpoint detection. For example, a layer 1708 would be comprised of $Al_2O_3$ and the gap 1709 preferably has $Al_2O_3$ doped with Ti where the material to detect for end point would be Ti. However, the layer 1709 could be doped (less than 10% by weight) with another material that can be clearly detected using an end point detection signal.

The mask structure 1709 can also include an image transfer layer 1710 formed over the first hard mask structure 1707. The image transfer layer can be a soluble polyimide material such as DURAMIDE®. A second hard mask 1712 can be provided over the image transfer layer 1710 and can be constructed of $SiO_2$ having a thickness of about 125 nm. An antireflective coating layer 1713 can be provided over the second hard mask 1712. The antireflective coating layer 1713 can be constructed of the same material as the image transfer layer 1710 (eg. a soluble polyimide solution such as DURAMIDE®), and can have a thickness about 120 nm. The resist mask layer 1714 can have a thickness of about 250 nm and can be deposited over the anti reflective coating layer 1713.

Figure 18:
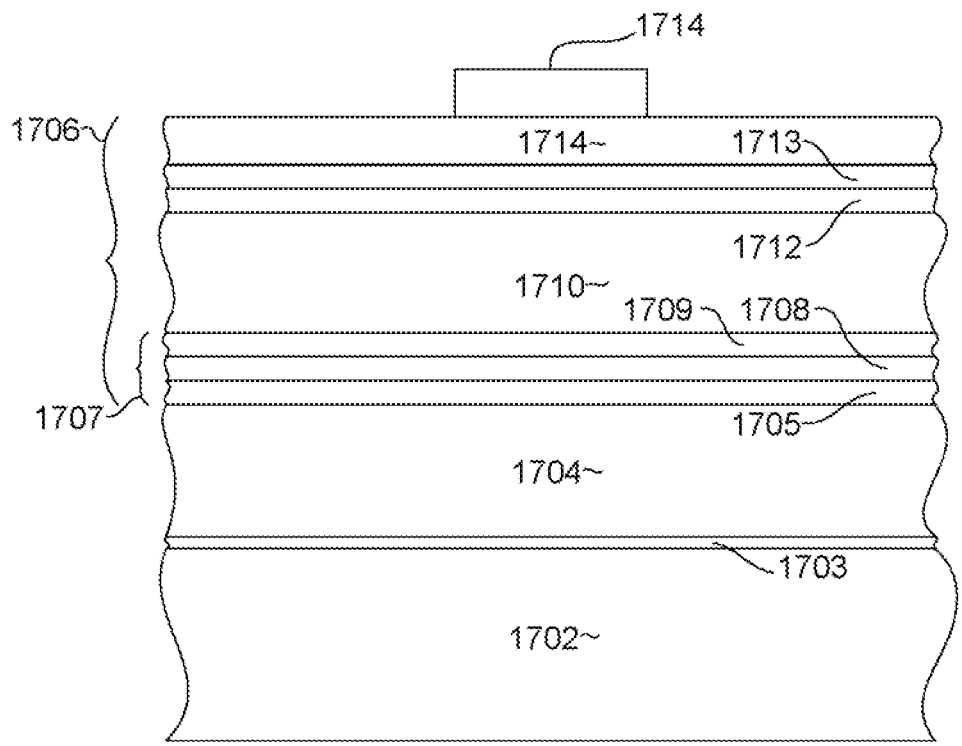
Figure 19:
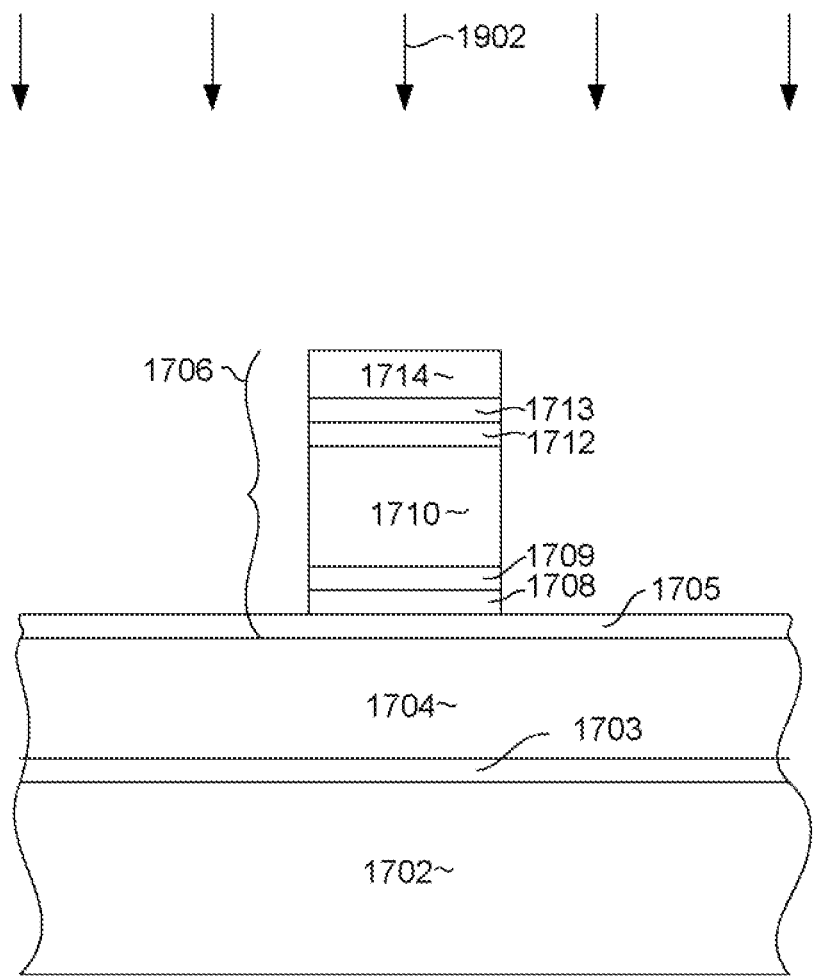

With reference now to FIG. 18, the resist layer 1714 is photolithographically patterned and developed to have a shape that is configured to define a write pole. Then, with reference to FIG. 19, one or more material removal processes 1902 are performed to transfer the image of the photoresist layer onto the underlying mask layers. The material removal processes preferably include a combination of reactive ion etching (RIE) and reactive ion milling (RIM), which remove the remove portions of the mask layers 1708, 1709, 1710, 1712 and 1713, while leaving the first sub-layer 1705 of the first hard mask 1707 substantially intact to protect the magnetic write pole layer 1704 from being damaged by the material removal processes 1902.

Figure 20:
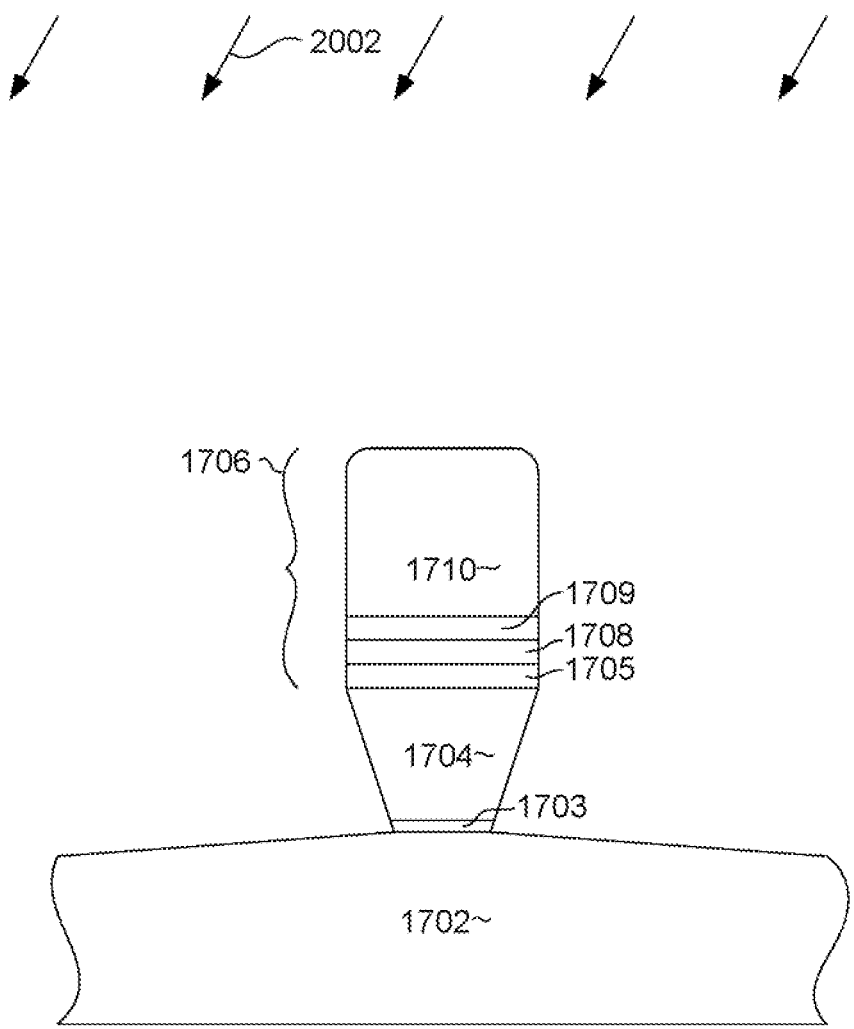

Then, with reference to FIG. 20, an ion milling process 2002 is performed by directing an ion beam at an angle relative to normal to remove portions of the magnetic write pole material 1704 that are not protected by the mask structure 1706. It can be seen that while some of the mask structure 1706 is consumed by the ion milling 1706, a considerable portion remains. The angled ion milling 2002 results in the write pole 1704 having a desired trapezoidal shape, such as is shown in FIG. 20 and which has been previously discussed above.

Figure 21:
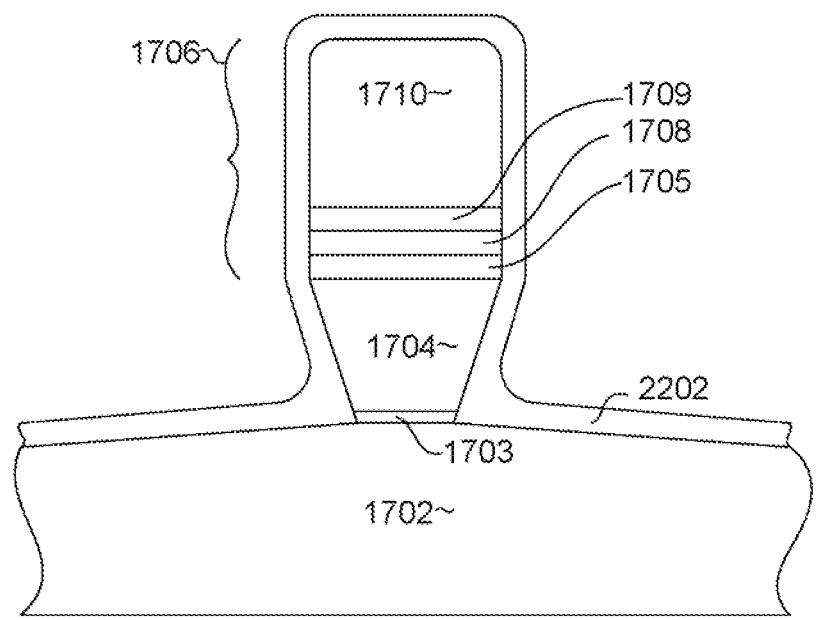
Figure 22:
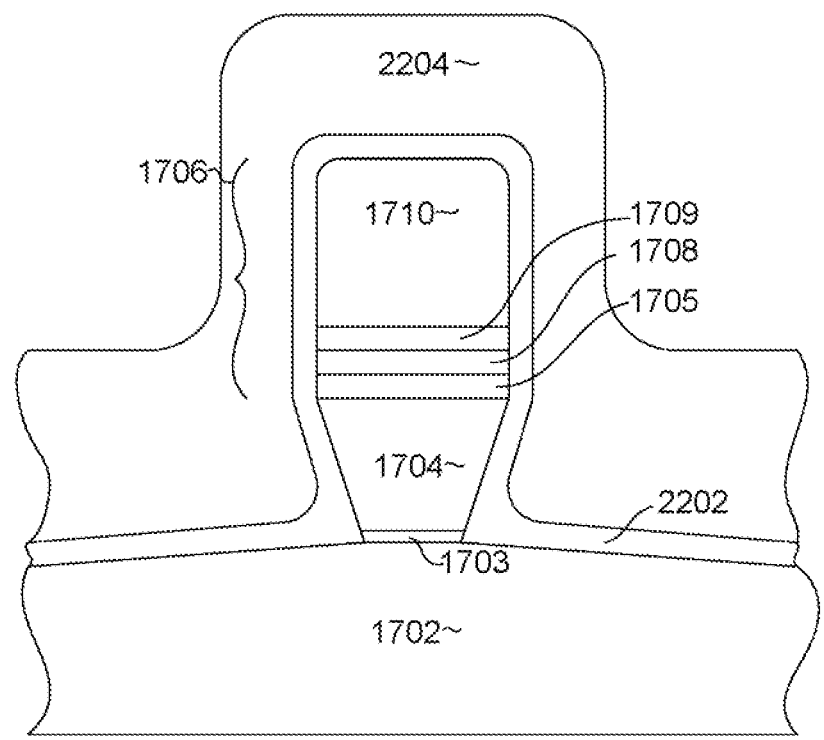

With reference now to FIG. 21, a non-magnetic side gap material 2202 is deposited. The side gap material can be alumina ($Al_2O_3$) and is preferably deposited by a conformal process such as atomic layer deposition (ALD) or some other conformal process.

The side gap material 2202 could also be a non-magnetic metal. If a metal is used as the side gap material 2202, then it must be a material that can remain in the ABS without presenting corrosion problems. Then, with reference to FIG. 22, a fill material 2204 is deposited. This fill material 2204 is preferably a material that can be readily removed without damaging the write pole material. For example, in one preferred embodiment, the fill material 2204 can be a material such as $SiO_2$, which can later be removed by a process that will be described below. In another preferred embodiment, the fill material 2204 can be a material such as Cu or some other non-magnetic material.

Figure 23:
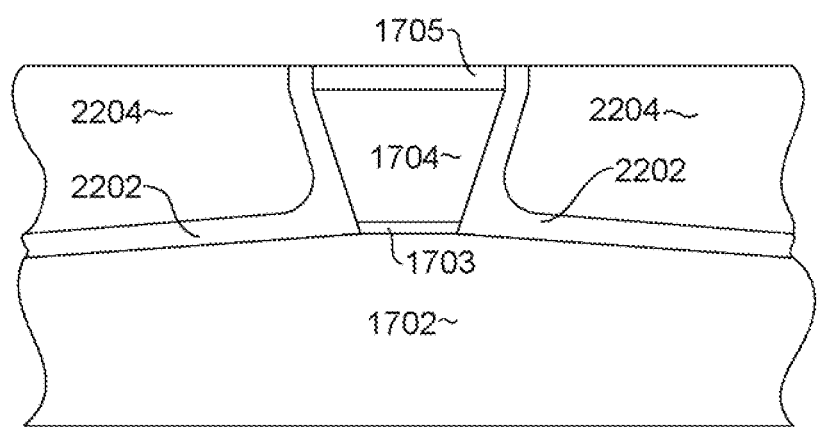
Figure 24:
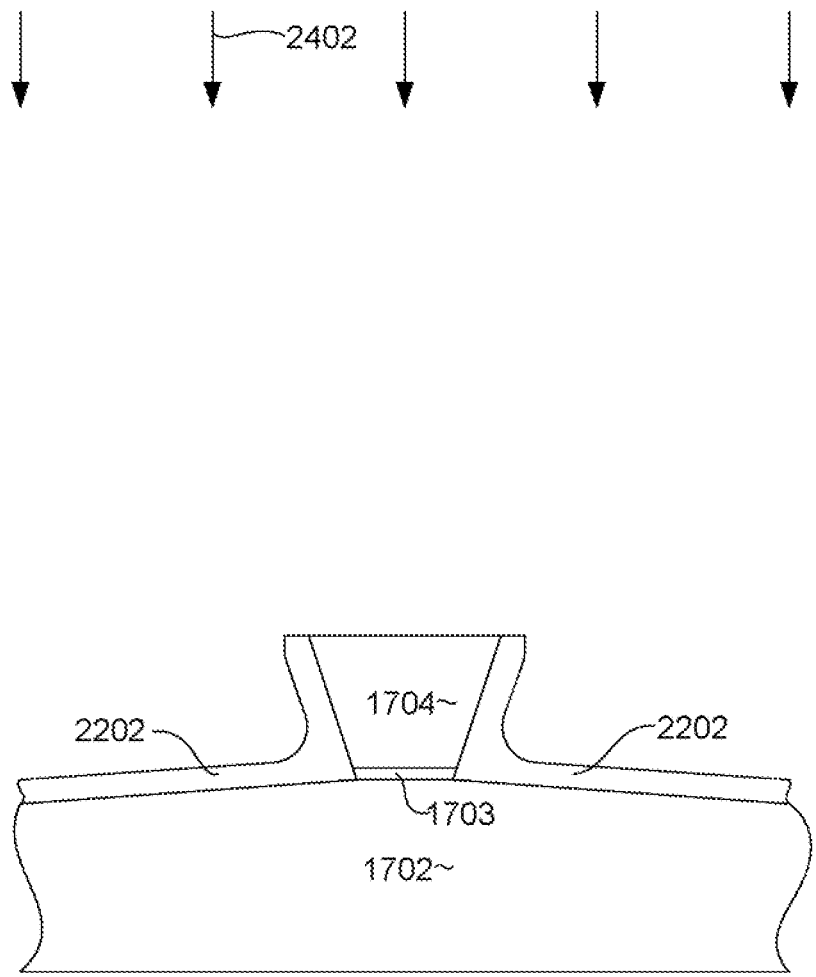

With reference now to FIG. 23 a chemical mechanical polishing process (CMP) is performed to planarize the structure and remove most of mask layer 1706 from over the pole 1704. The bottom layer 1705 can be used as a CMP stop layer so that CMP can be stopped when the layer 1705 is reached. The remaining mask material (CMP stop layer) 1705 (FIG. 22) can be left intact and becomes part of TG or can be removed by a material removal process suited to the material making up the layer 1705. For example, if the layer 1705 is diamond like carbon (DLC) it can be removed by using an oxygen containing reactive ion etch (RIE) plasma. Then, with reference to FIG. 24, the fill material 2204 can be removed. If the fill layer 2204 is a material such as silicon dioxide ($SiO_2$), then the fill layer 2204 can be removed by a fluorine containing reactive ion etching (RIE) plasma or reactive ion milling (RIM) beam. Alternatively, the fill and CMP process can be omitted and a reactive ion milling process (RIM) can be used to remove the mask structure 1710. In that case, the bottom mask layer 1705 (such as Ti or Rh) or 1709 can be used as an etch stop indicator using secondary ion mass spectroscopy (SIMS) to detect when the layer 1705 has been reached. The selection of a layer 1705 or layer 1709 which comprises an end point material enables the ability to control TG thickness. One can also insert more than one end point layer, such as one in layer 1705 and layer 1709. This gives the manufacturing of heads the flexibility of altering the trailing gap (TG) for different products having different gap targets. This can also affect the associated side gap (SG). Furthermore, the end point materials in the two layers could be comprised of different materials (eg. Ti for one layer and Ta for another end point layer).

The above described processes result in a write pole having non-magnetic side walls 2204 and a non-magnetic trailing gap layer 1705 formed over the write pole 1704.

If the fill material 2204 is Cu, then a different process can be performed to remove it after the CMP. One method that can be employed to remove the Cu fill layer 2204 is emersion in a basic completing etch bath that will not readily etch the CoFe pole material 1704. The Cu fill layer 2204 could also be removed by electroetching.

Figure 25:
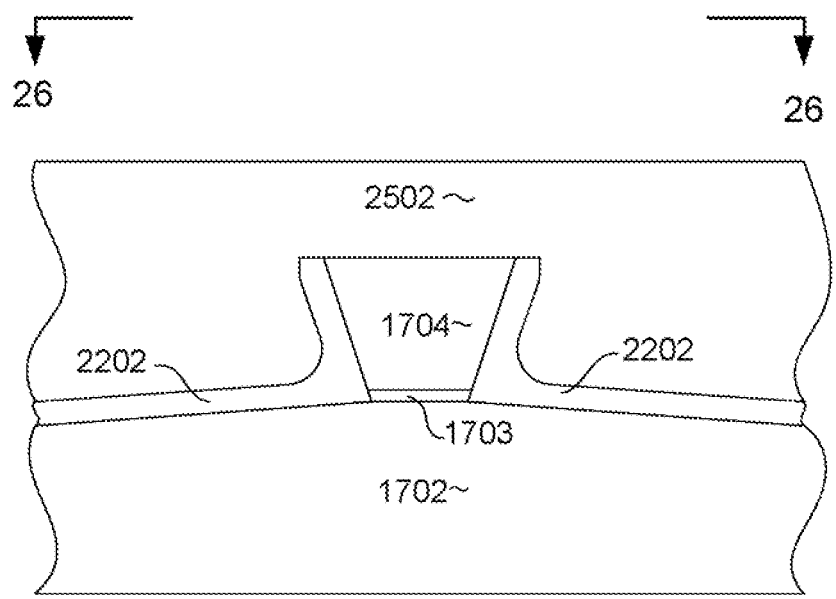
Figure 26:
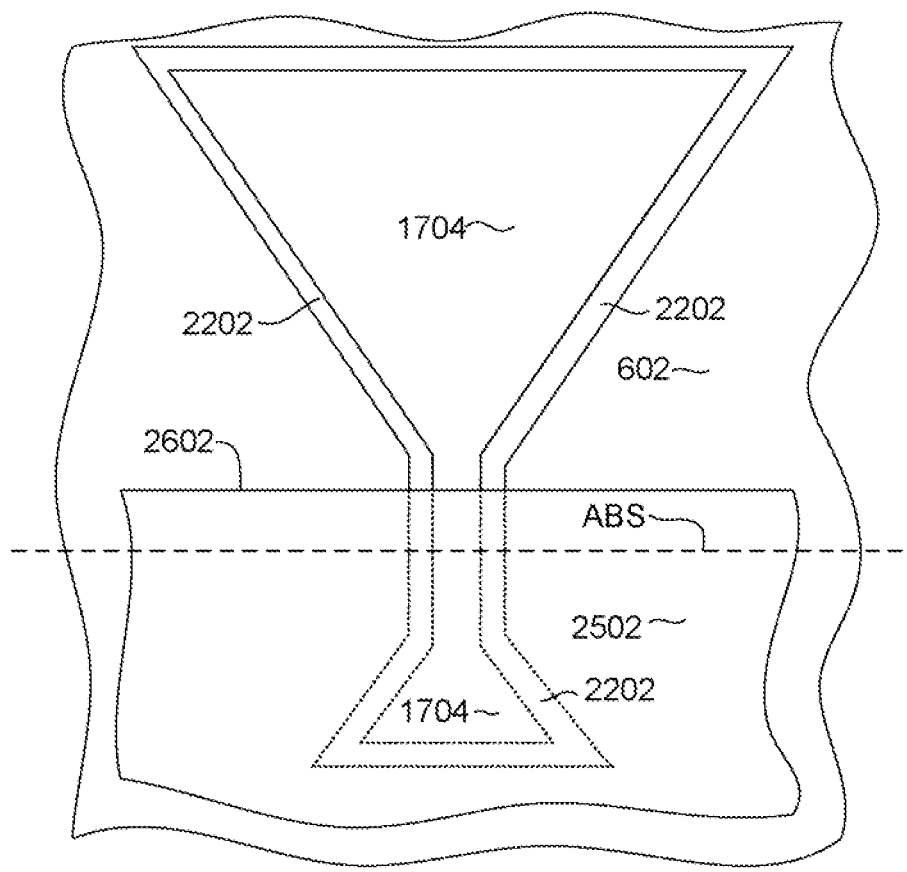

With reference now to FIGS. 5, 25 and 26, a photoresist mask 2502 is formed. As can be seen in FIG. 26, the mask 2502 has a back edge 2602 that is located behind the ABS plane between the ABS plane and the flare point 408 of the write head 1704. As shown in FIG. 26, the portions of the pole 1704 and side walls 2202 that are hidden beneath the photoresist mask 2602 are shown in dotted line.

Figure 27:
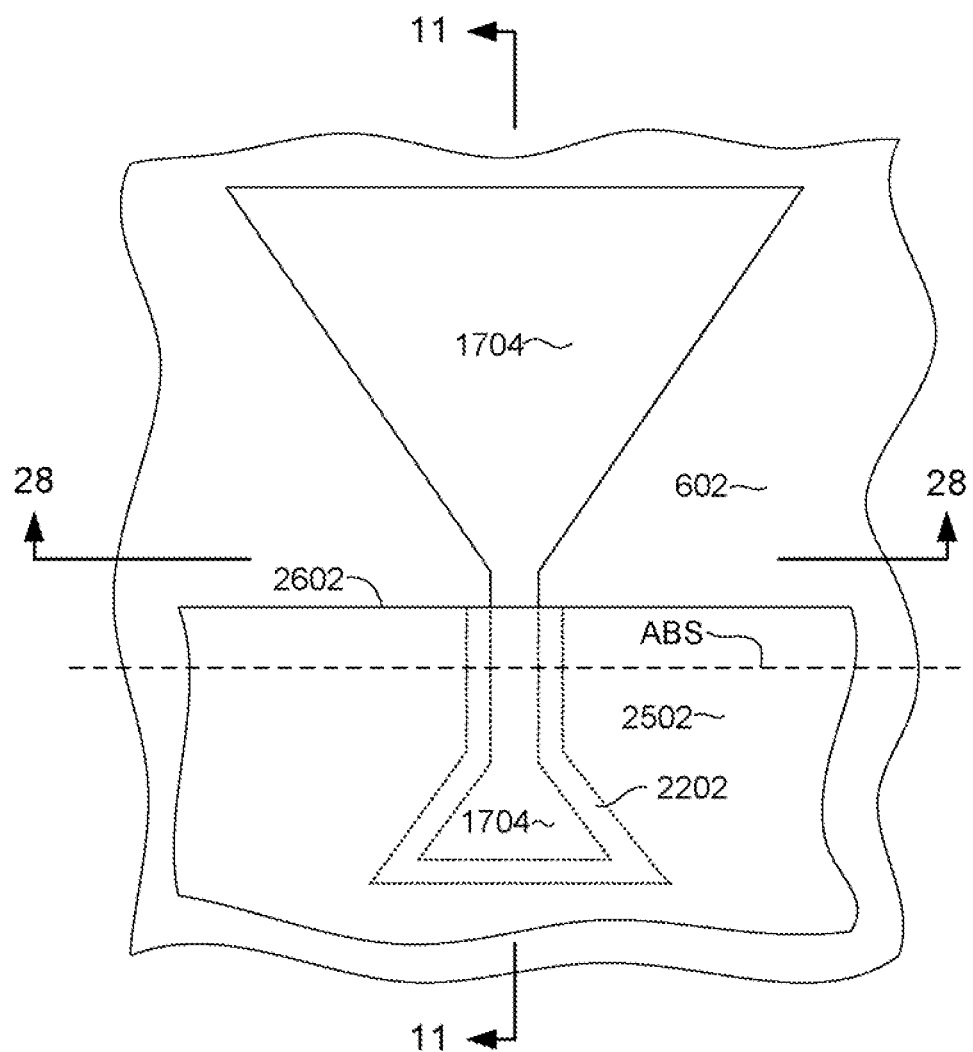

Then, with reference to FIG. 27, a material removal process is performed to remove portions of the sidewall material 2202. If the side wall material 2202 is alumina, it can be removed by an etching process that is designed to remove the alumina side wall material 2202 without damaging or removing the pole material (eg. CoFe). Possible etching solutions include a metal ion free developer solution such as tetramethylammonium hydroxide (TMAH), KOH, or a chrome etch such as CR-7® produced by Cyantek® of Fremont, Calif. The choice of what etchant to use will depend upon the side-gap material 2202. Whatever method of etching is used, it must cleanly remove all of the side wall material, to insure effective plating of a magnetic material onto the pole 1704 as will be described in greater detail herein below. If the side gap 2202 material is a Zn alloy, it can be removed from the area behind the mask 2502 by electroetching. If the side gap 2202 is constructed of silicon oxide (SiOx) it can be removed etching with an HF acid that is buffered (BOE). This results in a structure as shown in FIG. 27.

Figure 28:
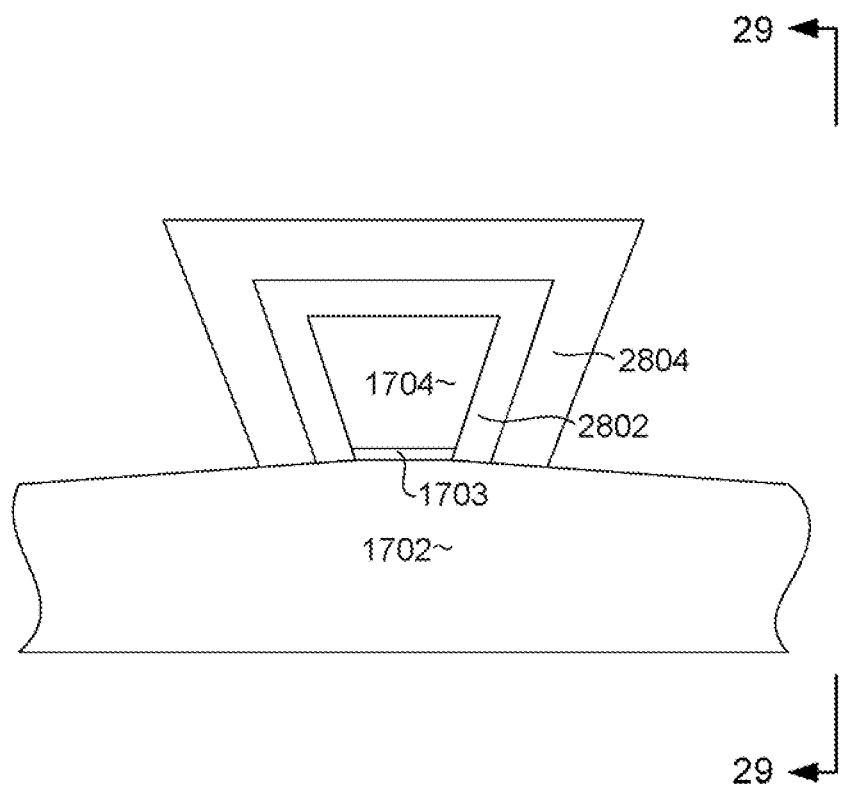

With reference now to FIG. 28, which shows a cross section of the write pole in a region beyond the back edge 2602 of the mask 2502 (shown in FIG. 27), a magnetic material 2802 can be electroplated onto the portion of the pole 1704. This magnetic material 2802 can be, for example CoFe, NiFe, or their alloys and is preferably CoFe. This magnetic material forms a stepped structure on the write pole similar to the step 406 described in FIG. 4, and is similar to FIG. 16B where the plated materials 2802 and 2804 may be the same as 404 and 1510 as seen in FIG. 16B. In order for this stepped pole structure to function optimally, there must be no non-magnetic remnant material left between the pole 1704 and the magnetic material 2802. This is one reason that the above described process used to remove the side wall material 2202 must very effectively remove all of this material, optionally, a non-magnetic gap layer 2804 can then be deposited over the plated magnetic layer 2802. This non-magnetic layer can be a non-magnetic metal, such as Cu or NiP and can be electroplated directly onto the magnetic layer 2804.

Figure 29:
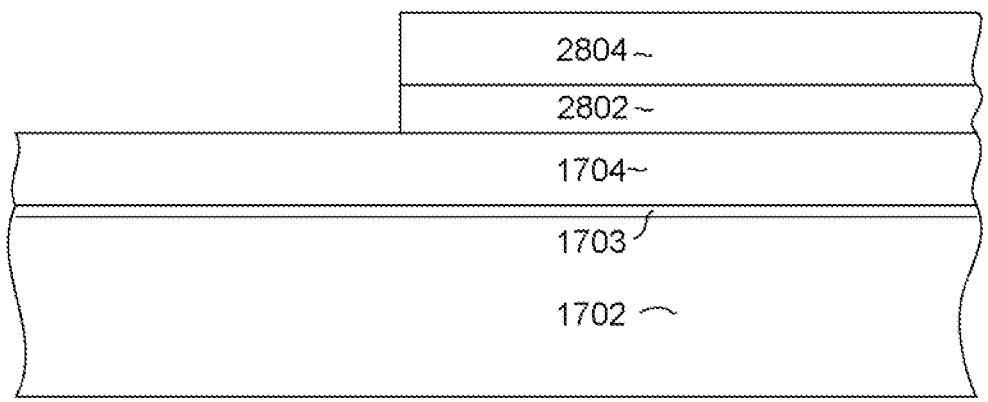
Figure 30:
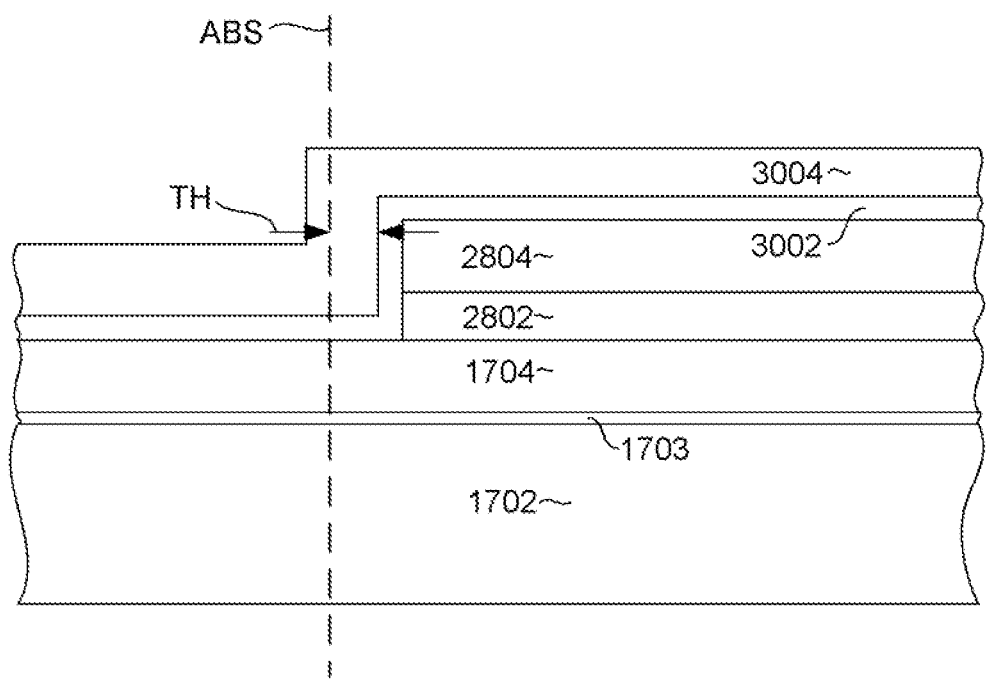

The resist mask 2502 can then be lifted off, leaving the structure as shown in a side cross sectional view in FIG. 29. Then, with reference to FIG. 30, a non-magnetic trailing gap layer 3002 can be deposited. This layer 3002 can be a non-magnetic material such as Ta and/or Rh, Au, and Ir, which can be deposited by a conformal deposition method such as ion beam deposition (IBD). The non-magnetic trailing gap layer 3002 is deposited to such a thickness to provide a desired trailing gap thickness TG and side gap thickness SG as described in FIG. 16A. Then a magnetic material 3004 can be deposited by electroplating to provide a magnetic trailing shield, such as the trailing shield 1506 described above with reference to FIG. 15. A lapping process (not shown) can be used to remove material (from the left side as shown in FIG. 30) until the ABS plane has been reached, thereby forming a write head with an air bearing surface (ABS) and having a trailing shield 1506 with a desired throat height as measured as measured from the ABS. The above described processes can produce a magnetic write head 1504 such as that described with reference to FIGS. 15, 16A and 16B, having a desired stepped pole structure 310 with a trailing shield 1506.

Figure 31:
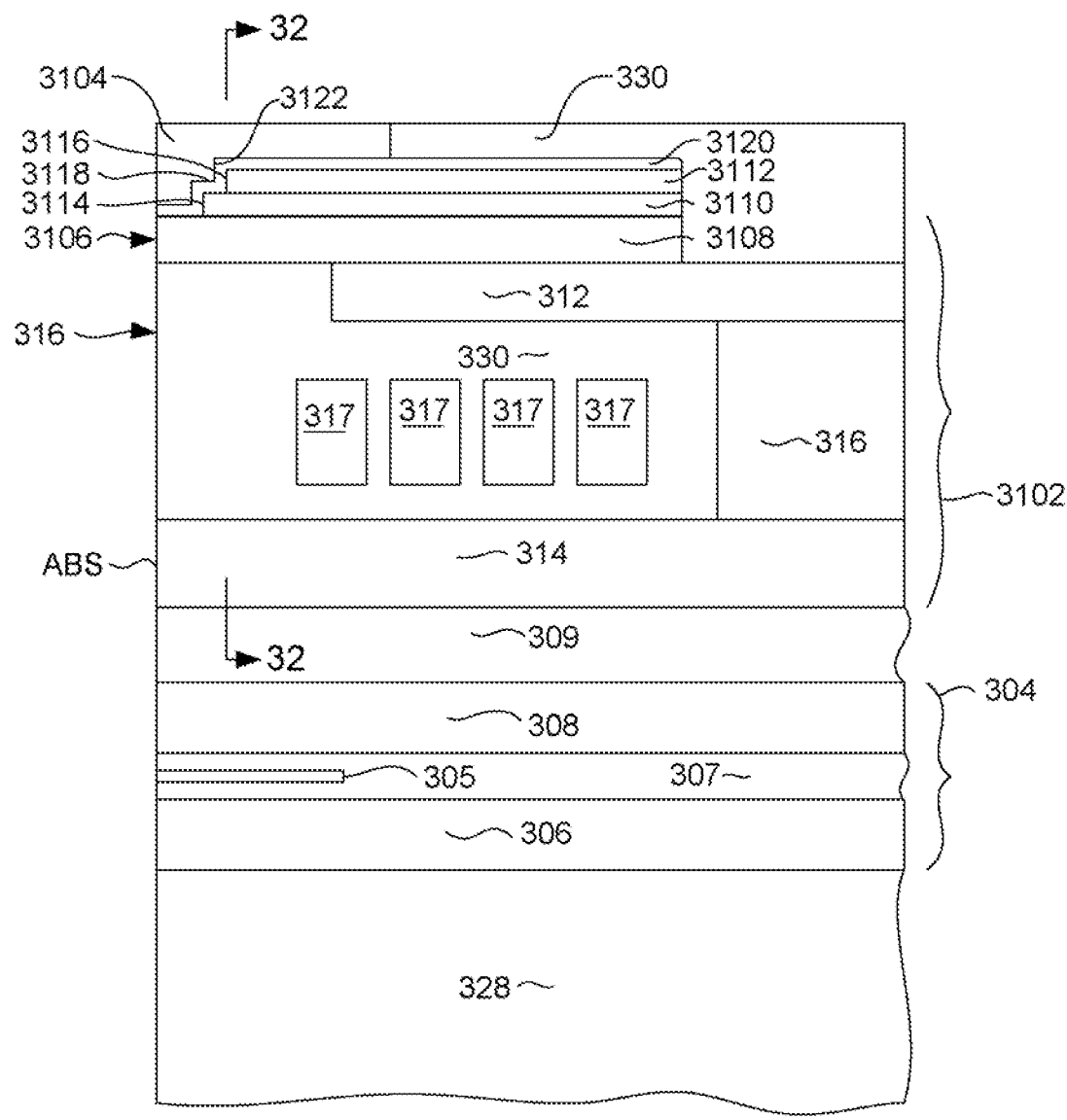
FIG. 31 is a side, cross-sectional view of a magnetic head according to yet another embodiment of the invention.
Figure 31A:
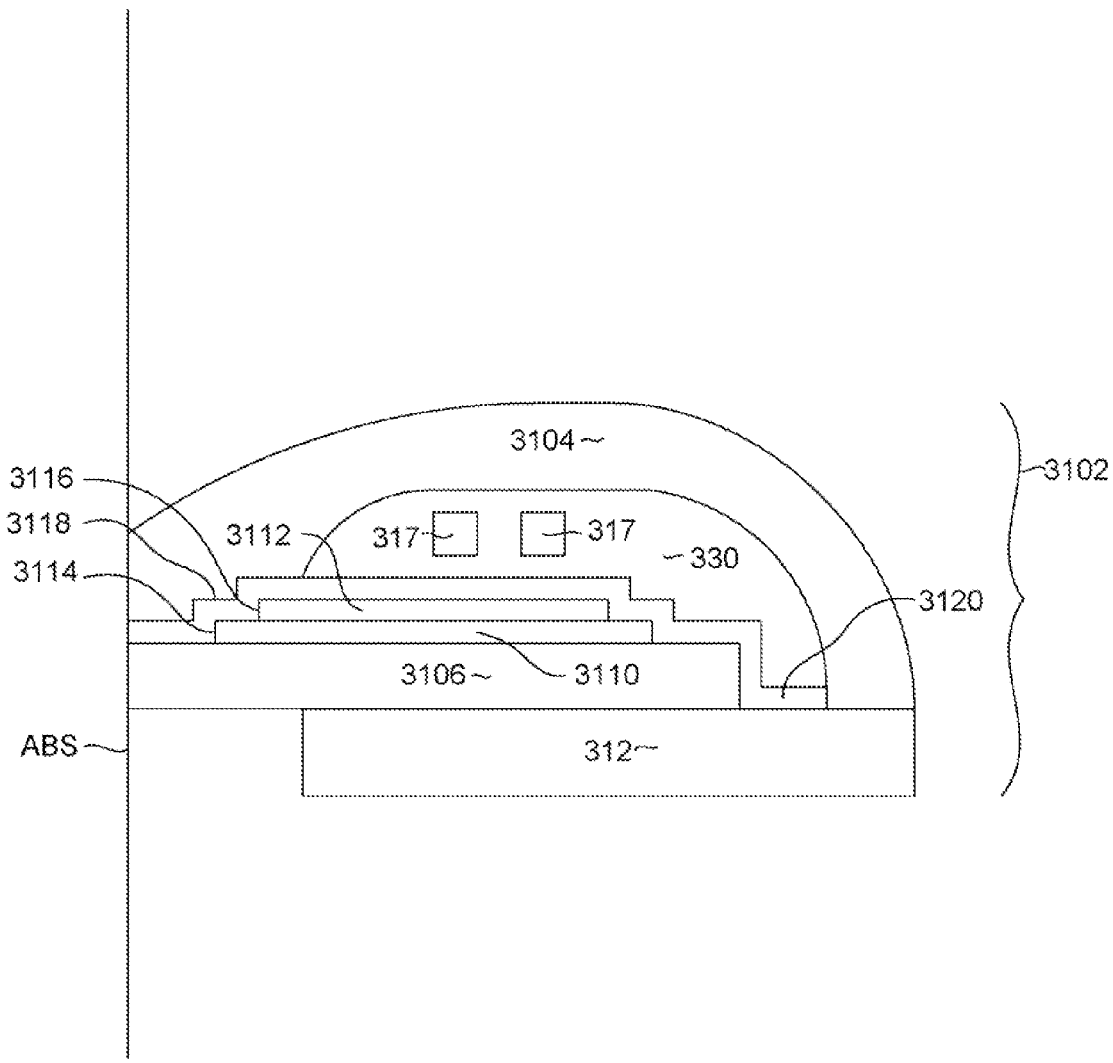

Write Head with Stair Stepped Trailing Shield:

With reference now to FIG. 31 a magnetic write head 3102 having a stair stepped trailing shield 3104 is described. The write head includes a magnetic write pole 3106, that has a core portion 3108 similar to the core 402 described above with reference to FIGS. 15, 16A and 16B. The pole 3106 also has a magnetic shell portion 3110 that is similar to the magnetic shell 404 described with reference to FIGS. 15 and 16B. The trailing shield 3104 can also act as a return pole 314 as seen in FIG. 31A.

Figure 32:
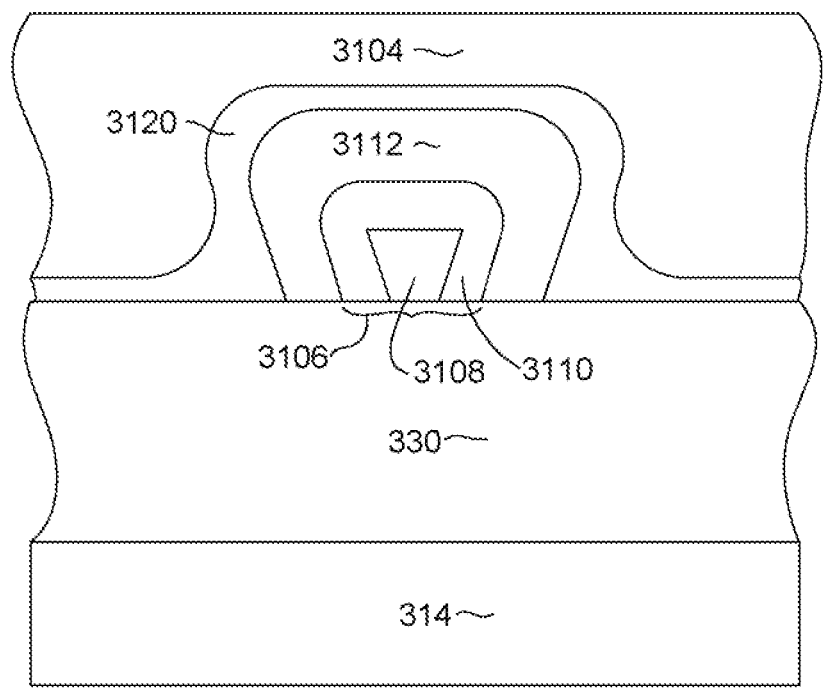
FIG. 32 is a cross-sectional view taken from line 32-32 of FIG. 31.

In addition, the write head 3102 includes a non-magnetic spacer layer 3112. The non-magnetic spacer layer 3112 is similar to the spacer 1510 described with reference to FIGS. 15 and 16B in that it wraps around the top and sides of the stepped magnetic shell structure 3110 as shown in FIG. 32. However, as can be seen in FIG. 31, the non-magnetic spacer structure is stepped back from the ABS. In other words the magnetic shell has a front edge 3114 that is recessed from the ABS by a first distance, and the non-magnetic spacer 3112 has a front edge that is spaced from the ABS by a second distance that is greater than the first distance. The trailing shield 3104 is separated from the pole 3106 by a spacer 3112 comprising, for example, NiP and a non-magnetic trailing gap material 3120 that could be constructed of for example, alumina and Ta and/or Rh, Au, and Ir.

This extra recession of the non-magnetic spacer 3112 allows the magnetic shield 3104 to form a stair stepped back edge 3118 that tapers away from the ABS. This results in a magnetic shield 3104 that has a back edge 3122 that is coincident with or recessed beyond the secondary flare point defined by front edge 3114 of the magnetic shell structure 3110. Although shown as a single stair stepped notch, the number of stair steps could be increased to more closely resemble a smooth taper, if desired.

With reference now to FIGS. 33-42 a method is described for constructing a magnetic write head such as the write head 3102 discussed above. With particular reference to FIG. 33A a magnetic write pole core portion 3302 is formed on a substrate 3101, with non-magnetic side walls 3304 (preferably alumina) surrounding the magnetic core 3302. A photoresist mask 3306 is formed over a front portion of the write pole core 3302, the mask having a back edge 3308 that is between the ABS and the flare point 3310 of the core portion. A material removal process can then be performed to remove the portions of the side wall material 3304 that are not covered by the mask 3306 (ie. beyond the back edge 3308 of the mask 3306). This can be performed by methods such as those discussed above with reference to FIGS. 17-24.

Figure 34:
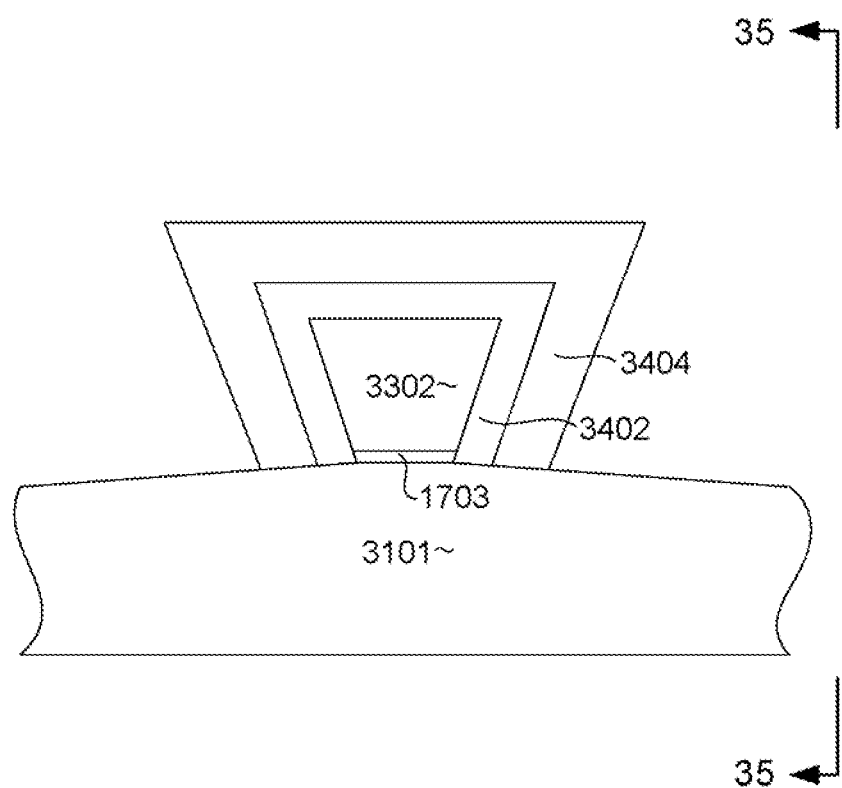

Then, with reference to FIG. 34 a magnetic material 3402 such as CoFe is deposited onto the magnetic write pole core 3302, preferably by electroplating. A non-magnetic metal 3304 such as NiP, ZnNi, Cu, Cr or Au is then deposited onto the magnetic layer 3302, preferably by electroplating. Then, the resist mask is lifted off, leaving a structure as shown in a side cross sectional view in FIG. 35A. Similarly, in FIG. 36, a magnetic and non-magnetic layer containing a stack which is electroplated may have a step between one layer and another where the first edge of one plated layer 3604 is protruding relative to the edge of a second plated layer 3602.

Figure 33A:
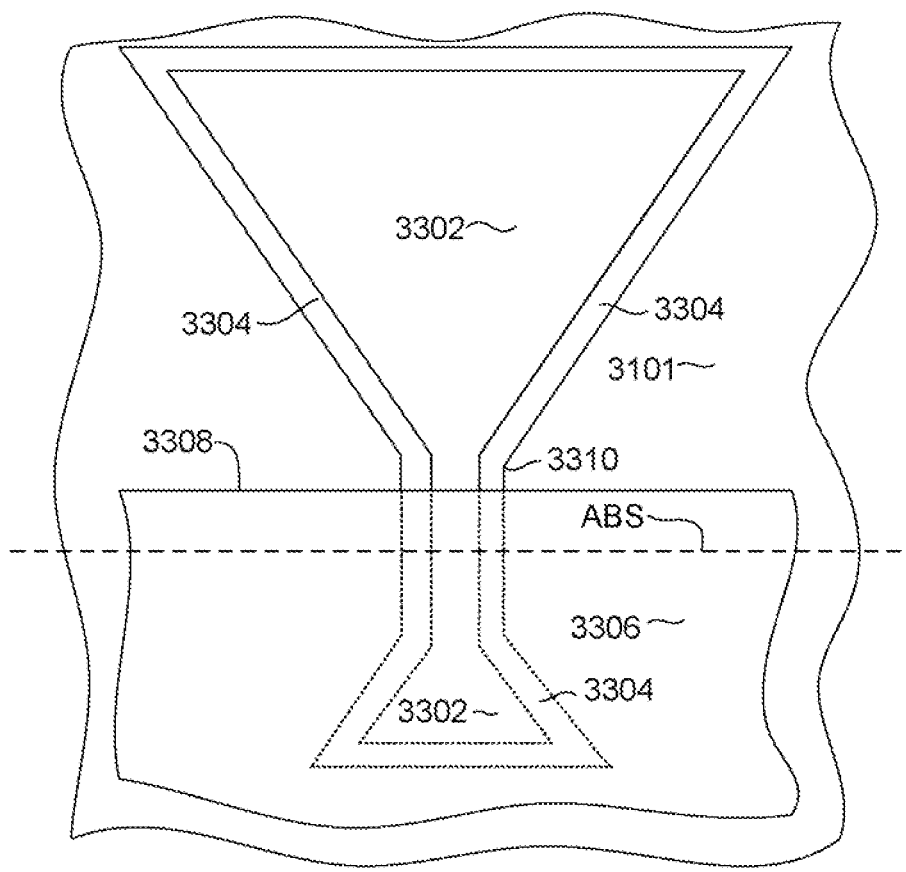
FIGS. 33-37 are views of a magnetic head in various intermediate stages of manufacture illustrating a method of manufacturing a magnetic head.
Figure 33B:
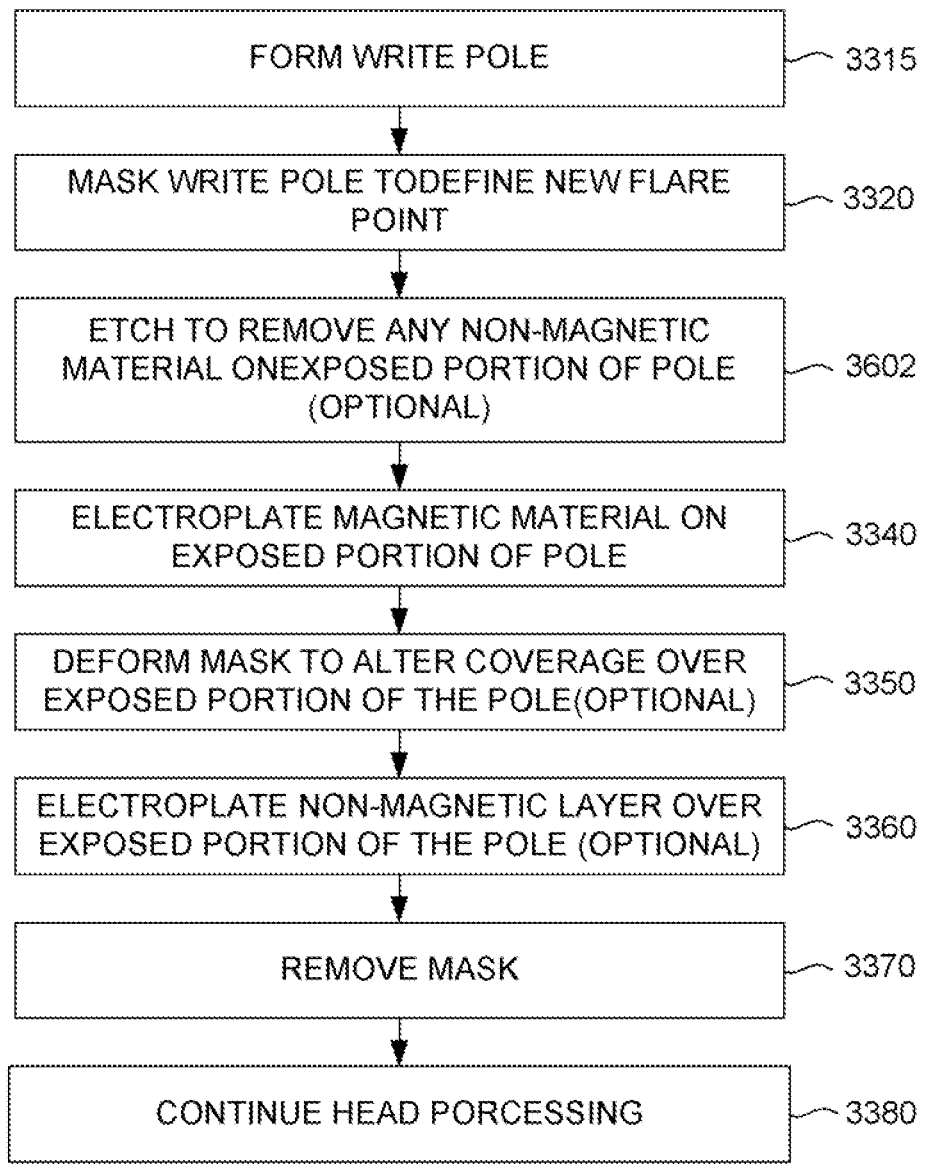

An example of the process flow is shown in FIG. 33B, where an existing pole 3315 will have a flare point defined by a masking step 3320. This is followed an etch of material on the pole 3302 in a step 3602. However, this is only needed if there is non-magnetic material covering the pole. Then, a magnetic layer is electroplated directly off of the pole 3302 in a step 3340. Optionally, in a step 3350 one may deform the mask layer after the magnetic layer is plated. In addition step 3360, an optional non-magnetic portion may be plated on the magnetic plated pole portion. The mask would be removed in a step 3370 and processing would continue 3380.

Figure 35A:
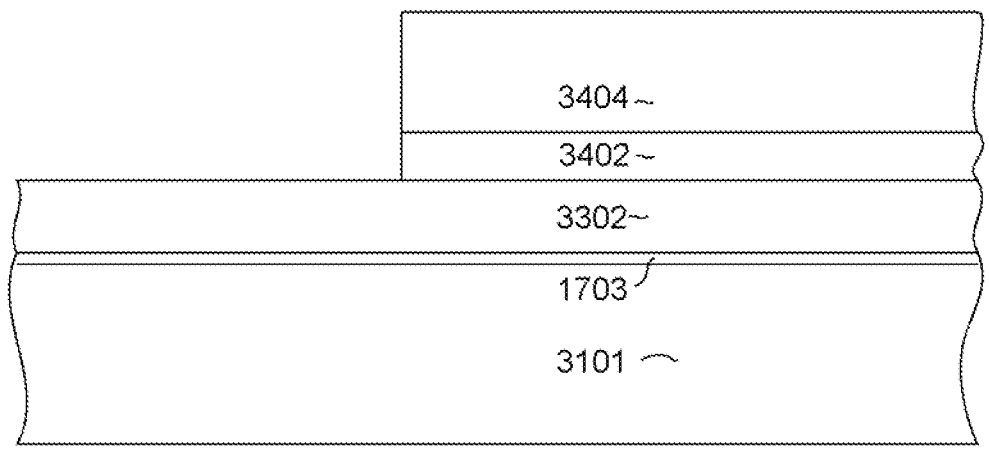
Figure 35B:
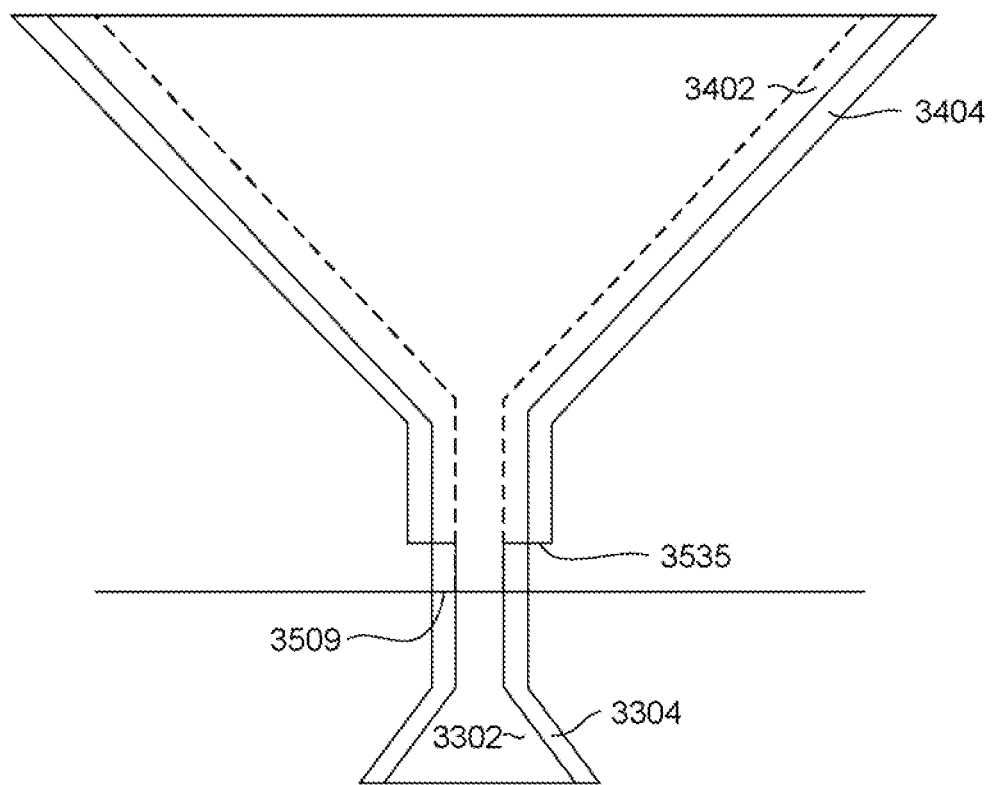
Figure 36:
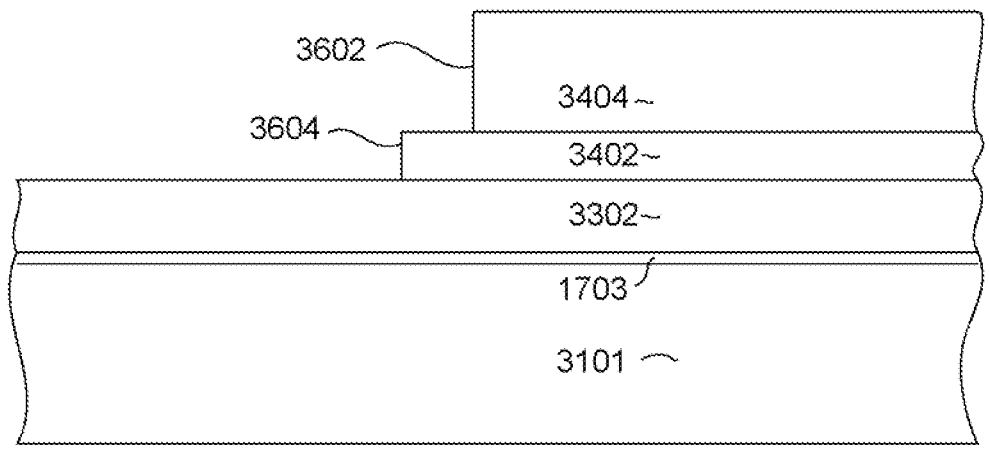

Referring to FIGS. 33A, 33B, 35A and 36, the material removal process 3602 is performed, prior to plating, to remove a portion of the non-magnetic layer 3304. The material removal process 3602 is a process that is carefully chosen to remove the non-magnetic metal 3304, without affecting the magnetic layers 3404 or 3302. This process 3602 can be a wet etch. For example, if the non-magnetic layer 3404 is constructed of ZnNi, it can be removed by electroetching. If the non-magnetic layer 3404 comprises Cu, it can be removed by etching with a basic solution containing ammonium persulfate and ammonium hydroxide. If the non-magnetic layer 3404 is Cr it can be etched with a Cr etchant such as CR-7® produced by Cyantek Corp.®. If the non-magnetic layer 3404 is Au, it can be etched with potassium iodine. As can be seen in FIG. 35B, the removal of a portion of the non-magnetic layer 3304, allows for the plating of magnetic layer 3402 and non-magnetic layer 3404, defining a front edge 3509. This front edge of 3509 of, at least, the first electroplated layer will define the new flare point 3535.

Figure 37:
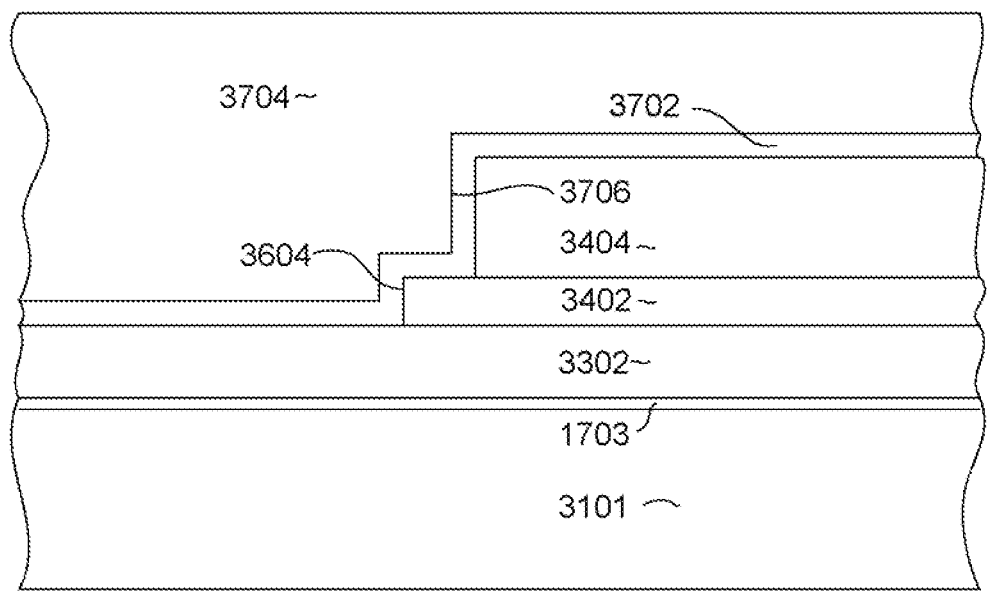

Then, with reference to FIG. 37, a non-magnetic trailing gap layer 3702 such as Ta and/or Rh, Au, and Ir, can be deposited, and a magnetic material 3704 such as NiFe, CoFe, or their alloys can be deposited by electroplating to form a trailing shield having a stair stepped back edge. In this manner, a trailing shield can be constructed that has a back edge 3706 that is either coincident with or behind the flare point defined by the front edge 3604 of the magnetic shell layer 3402.

Figure 38:
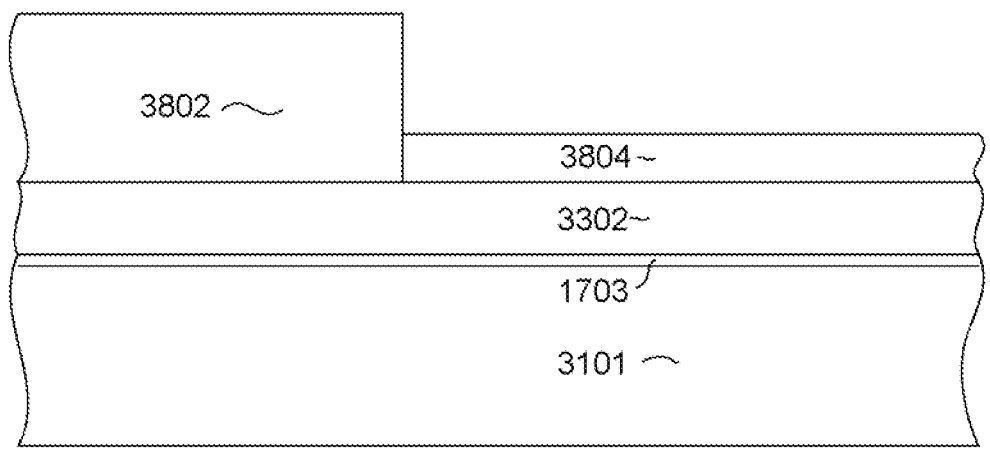
FIG. 38-42 are views of a magnetic head in various intermediate stages of manufacture illustrating a method of manufacturing a magnetic, head according to an alternate embodiment of the invention.
Figure 39:
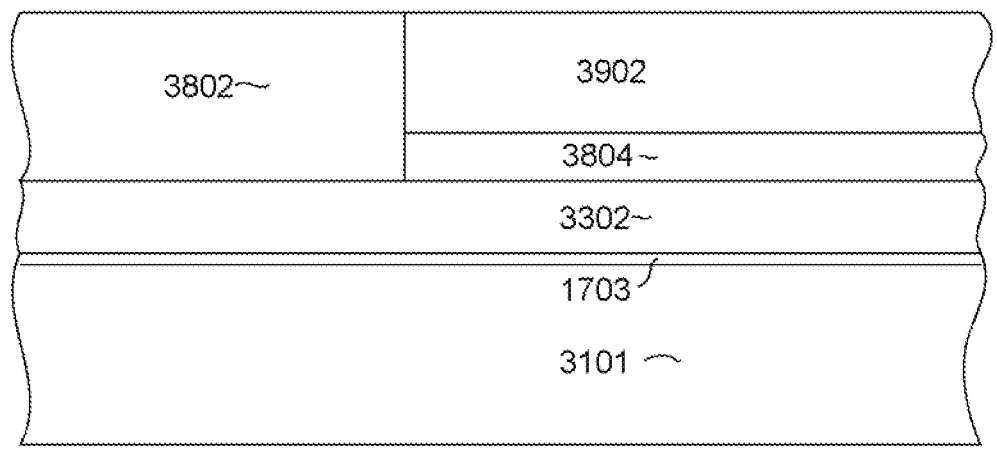
Figure 40:
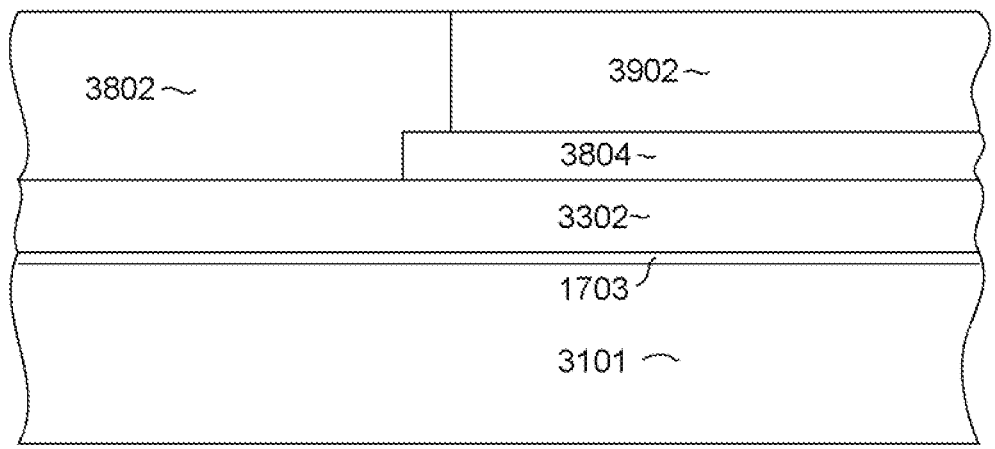
Figure 41A:
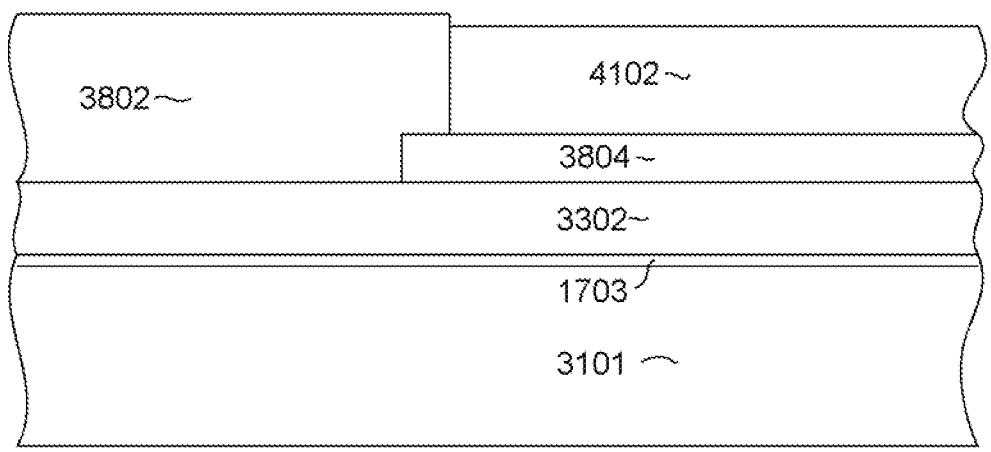
Figure 41B:
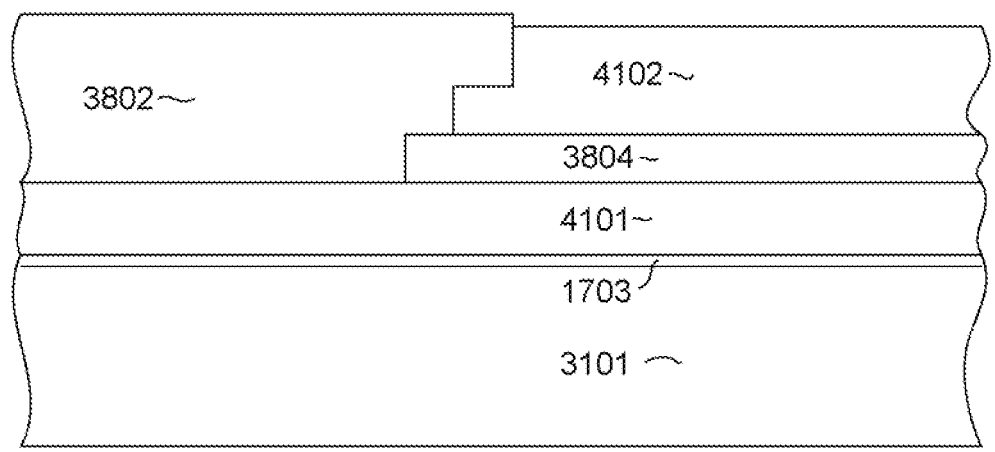
Figure 41C:
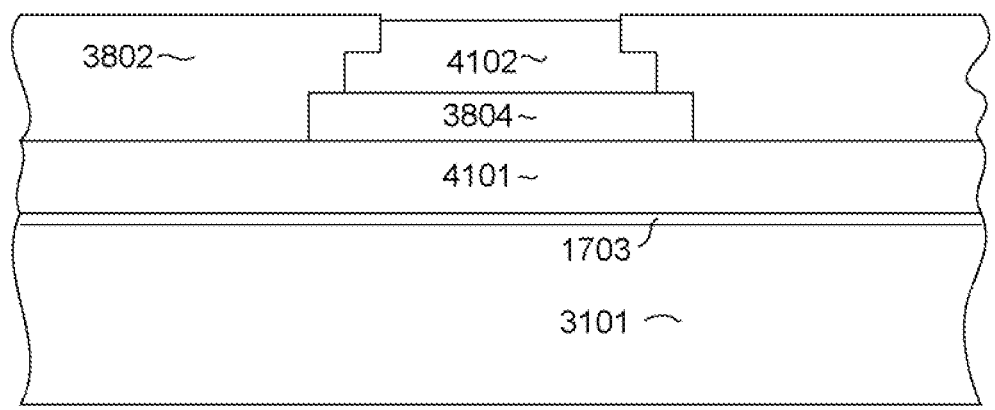
Figure 41D:
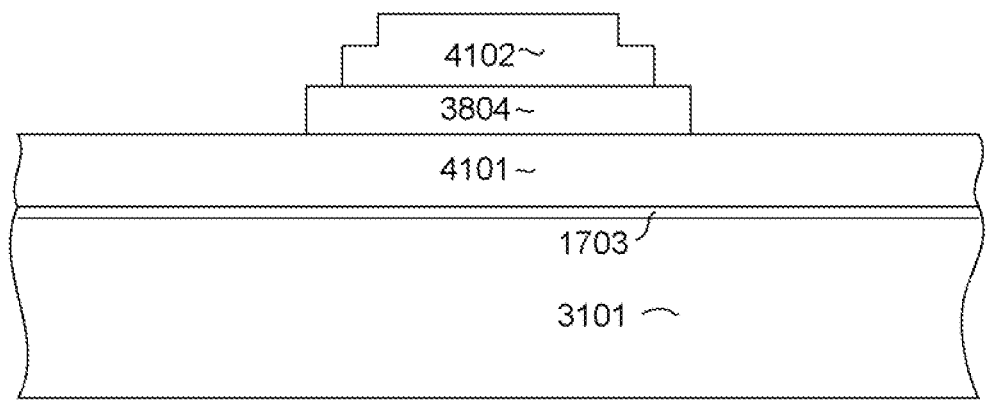
Figure 42:
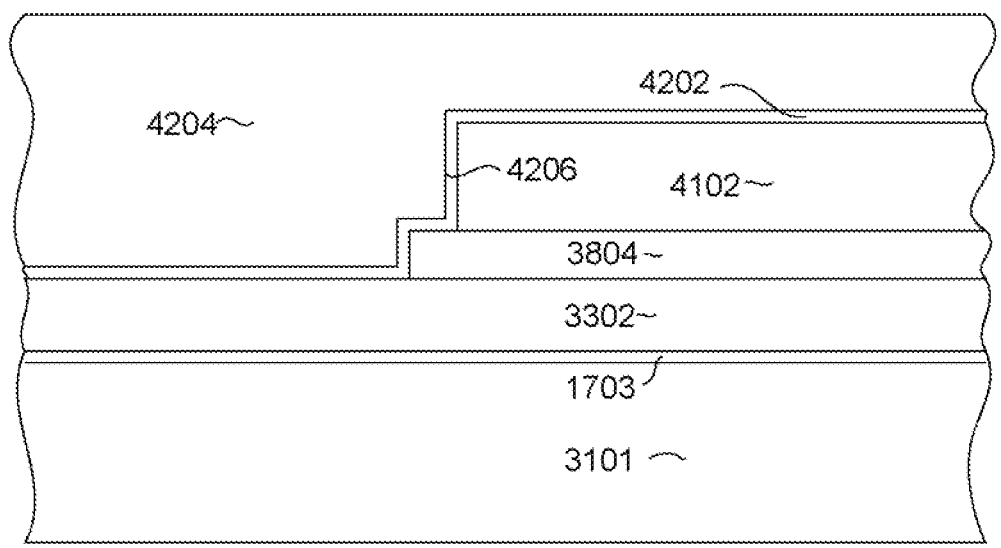

With reference now to FIG. 38 a possible method is described for constructing a stair stepped shield structure. After constructing a write pole core portion 3302 over an under-layer 1703 and substrate 3101, a photoresist mask 3802 is formed. Then, a layer of magnetic material 3804 is deposited to form the magnetic shell over the magnetic core 3302. Then, with reference to FIG. 39, a soluble material 3902 such as a SAFIER® coating is deposited (ie. spun on) to the structure. The structure thus far formed can then be heated. This heating causes the soluble coating 3902 to contract, pulling the photoresist mask 3802 with it, resulting in a structure as shown in FIG. 40, with the mask 3802 overlapping the magnetic shell 3804. Then, with reference to 41A, the shrinkable coating 3902 can be removed and a non-magnetic metal 4102 can be plated onto the magnetic shell 3804. Then, with reference to FIG. 42, a non magnetic gap layer 4202 such as Ta and/or Rh, Au, and Ir, which can be deposited and a magnetic material such as NiFe, CoFe, or their alloys can be deposited by electroplating over the gap layer 4202. As can be seen, this results in a magnetic shield 4204 having a stair stepped back edge 4206. Alternatively, a multi-stair structure can be created as shown in FIG. 41B, where upon some substrate with seed 4101 a multi-step structure is electroplated that comprises more than one material. Similarly, an electroplated feature can be formed as shown in FIG. 41C. This may comprise one or more materials with one or more steps where each step recession of less than 50 nm makes the structure progressively narrower, as seen in FIG. 41D. Depending on the head design, the distance from the flare point to the ABS 3737 may be less than, equal to, or greater than the distance from the back edge of the trailing shield and the ABS 3747.

Self Aligned Electrical Lapping Guide (ELG):

As seen in FIG. 37, the formation of a magnetic write head, such as the embodiments disclosed above require careful control of flare point (distance between flare point and ABS 3737) and trailing shield throat height (thickness of the trailing shield as measured from the ABS 3747). Both the write pole flare point and the trailing shield throat height are measured from the location of the ABS, which in turn is defined by a lapping operation. This lapping operation occurs alter the wafer has been cut into rows of sliders. A side of the row of sliders, or an individual slider, is lapped to remove material until a desired ABS plane location has been reached. At this point the row of sliders can be cut into individual sliders. This lapping operation is, however, difficult to control.

An electrical lapping guide (ELG) can be used to determine at what point lapping should be terminated. A lapping guide is an electrically conductive material, with an edge that is at a predefined from, or exactly at, the intended ABS plane. As lapping progresses, the electrical resistance of the lapping guide is measured by applying a voltage across the lapping guide. When this resistance reaches a predetermined level, the operator can determine that the ABS plane has been reached and lapping should terminate.

As can be appreciated, then, defining the location of the edge of the lapping guide must be carefully controlled relative to the intended ABS and relative to the flare point and shield throat height. However, manufacturing tolerances, such as aligning multiple mask photolithographic steps make this edge location control very difficult. The method described herein below provides an accurate self alignment process for accurately and reliably locating the critical edge of the lapping guide, relative to the ABS, flare point and shield throat height.

Figure 43:
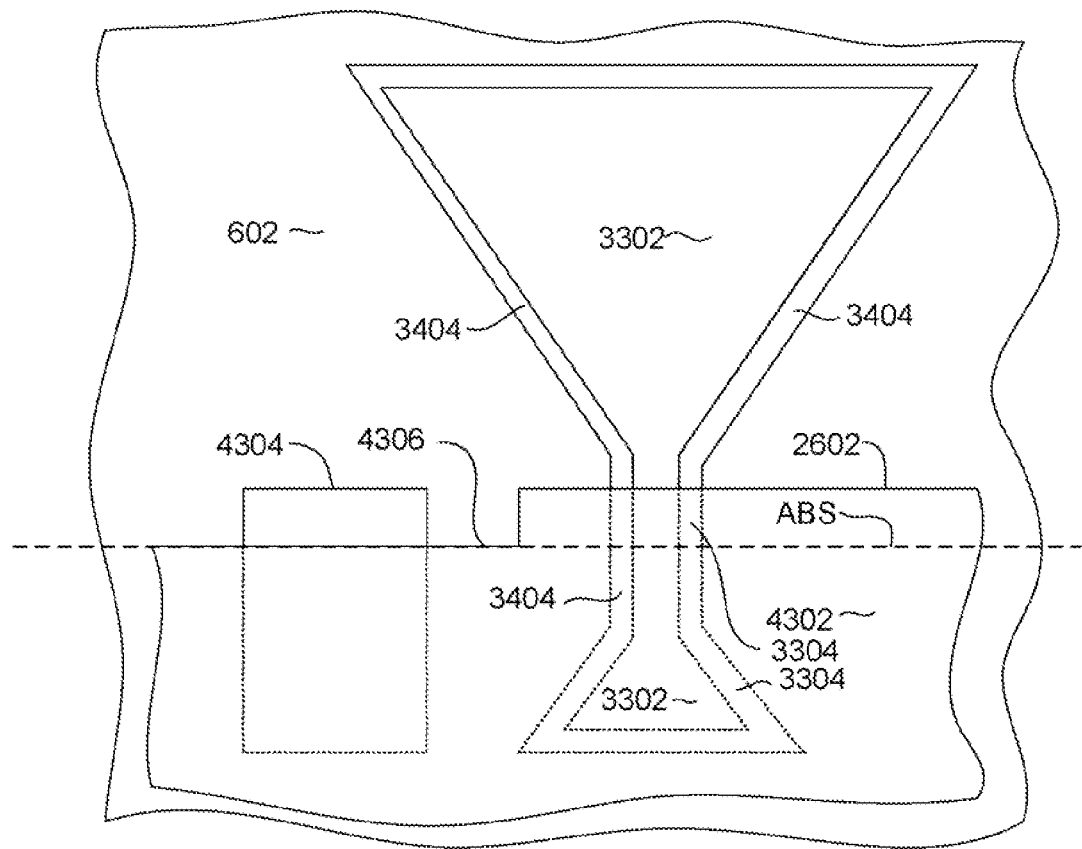
FIGS. 43-48 are top down views illustrating a method of forming a self aligned electrical lapping guide for accurately defining an air bearing surface (ABS) of magnetic write head.

With reference now to FIGS. 43 and 35B, a write pole structure 3302 is shown at a manufacturing stage similar to that described with reference to FIG. 26. This structure includes a write pole core portion 3302 and a non-magnetic side wall 3404 surrounding the write pole core 3302. An electrically conductive ELG 4304 is formed in a kerf area beside the write pole 3302. The ELG material can be formed by a liftoff process such as by forming a bi-layer photoresist mask (not shown), depositing an electrically conductive material, and then lifting off the mask. A substractive method could also be used. A mask structure 4302 is formed similar to the mask 2502 described in FIG. 26, except that this mask structure 4302 has a back edge 4302 that is aligned relative to the intended ABS plane. In fact, the edge 4306 could be located at the ABS plane as shown, or could be at some other predetermined location relative to the ABS plane. The mask 4302 and edge 4306 extend over, at least a part of, the ELG material 4304 as shown in FIG. 43.

Figure 44:
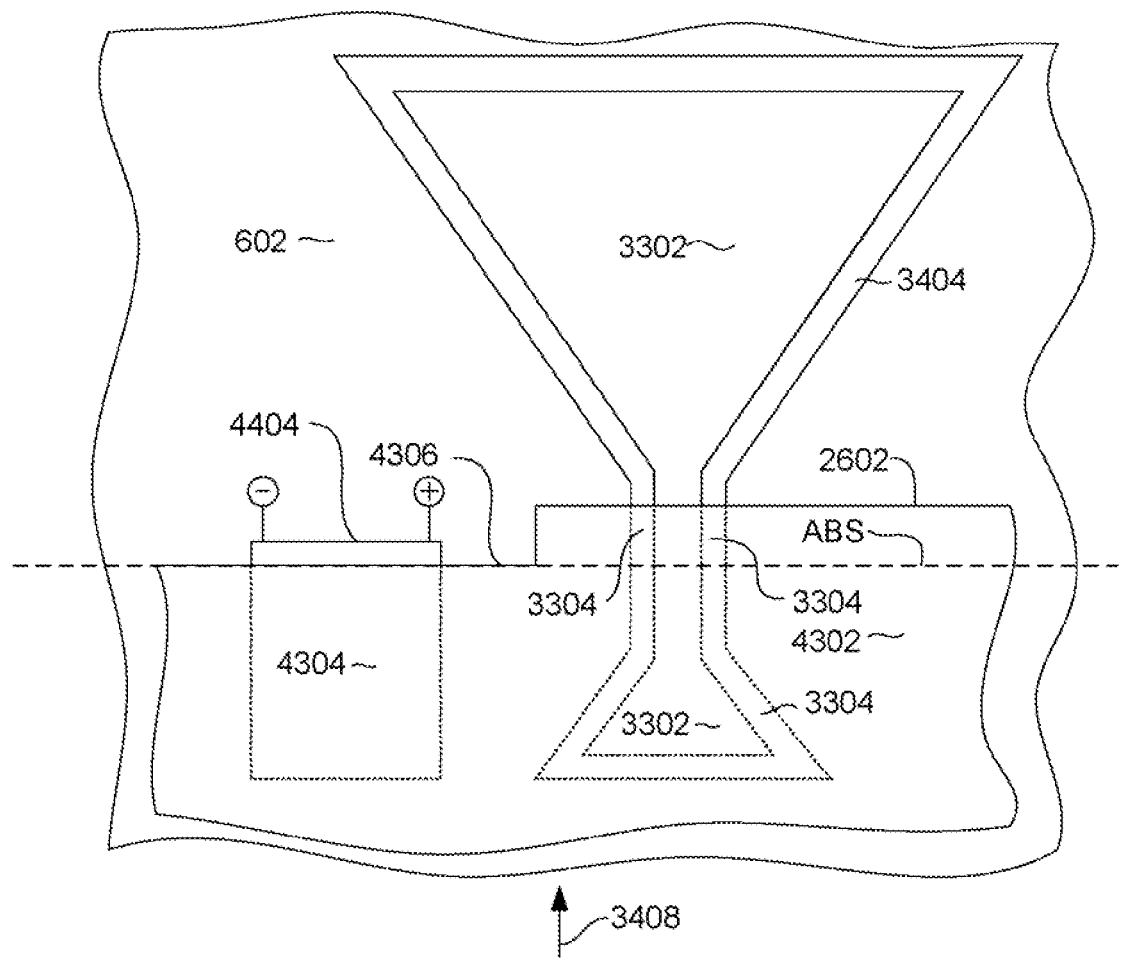

With reference now to FIG. 44, a material removal process such as that described above with reference to FIG. 27 can be performed to remove portions of the non-magnetic side wall 3404 that are not covered by the mask 4302. This removes the portions of the side wail 3304 that extend beyond the back edge 2602 of the mask 4302. The same or a different material removal process (such as reactive ion etch) can be used to remove the portion of the ELG 4304 that extends beyond the back edge 4306 of the mask 4302. As will be recalled from the discussions above, the location of the edge 2602 of the mask 4302 defines the location of the secondary flare point (for example FP2 in FIG. 5) as well as the trailing shield throat height (for example TH in FIGS. 15 and 30). Therefore, by continuing processing as described above with regard to the previously described methods and embodiments, the back edge 4404 of the ELG lapping guide is self aligned with the write head flare point and shield throat height and ABS. One can also say that the edge 4404 is self aligned so that the photo edge 2602 of the mask layer 4302 is used to define the ELG as well as the flare point (FP2) and its associated shield throat height TH, there is no need to align multiple masks in multiple photolithographic steps. During lapping, a voltage can be applied across the ELG 4304 to measure the resistance across the ELG. As lapping progresses in a direction as indicated by arrow 3408, the ELG will be consumed. As a greater and greater portion of the ELG is consumed, the resistance across the ELG will increase, and when a predetermined resistance is reached, lapping can stop. With the back edge located directly at the ABS as shown in FIG. 44, the lapping can the resistance across the lapping guide 4304 increases to infinity (ie. when the lapping guide 4304 is completely removed) by lapping material away.

Figure 43A:
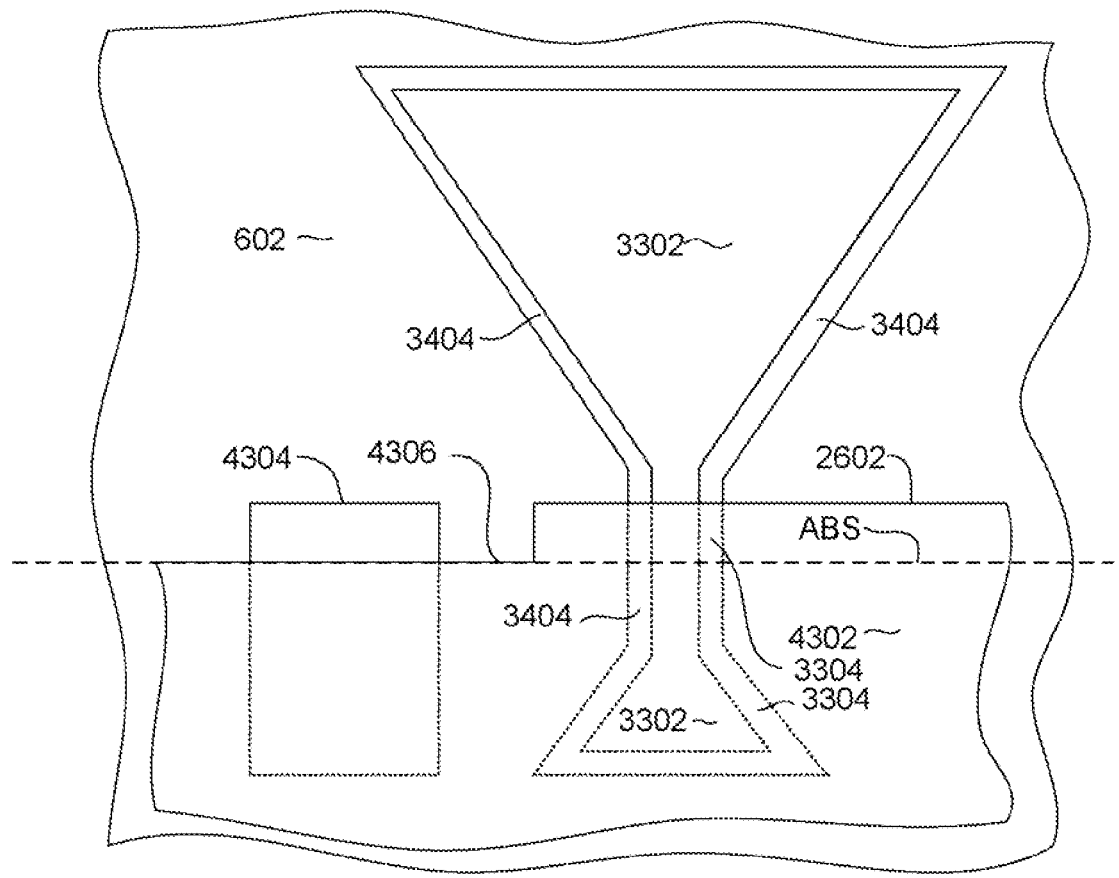
Figure 44A:
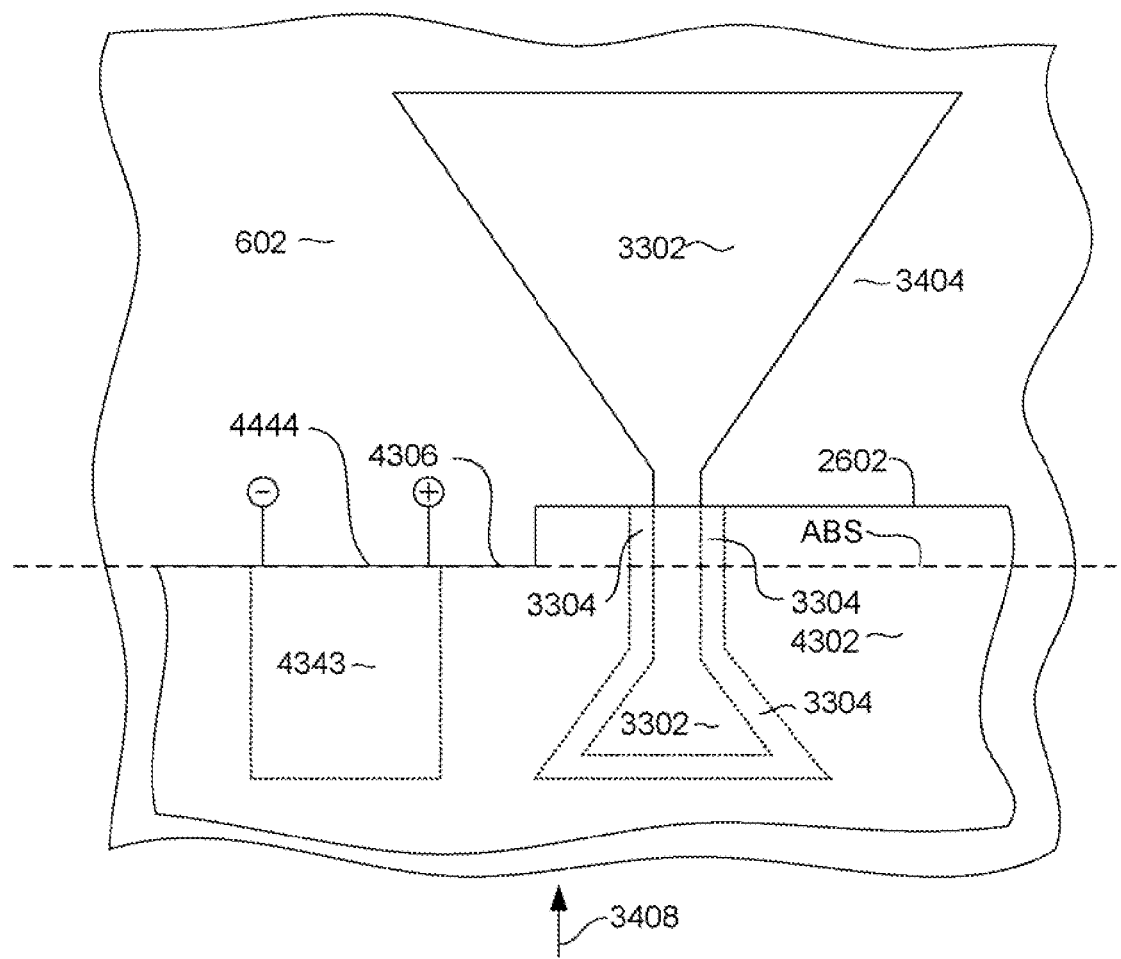

With reference to FIG. 43A, an alternate device that can be patterned is a sensor 4304. This may exist in a side-by-side head where a write head is co-planar with a sensor structure. Similar to the patterning of the write head ELG material 4304, the back edge of a sensor 4343 can be defined with the edge 4306 of the mask 4302. The sensor 4343 would be deposited and possibly partially patterned prior to deposition of the defining mask 4302. As symbolized in FIG. 44A, the sensor 4343 would be electrically connected to outside the device. This would result in a head that has the back edge 4444 of the sensor self-aligned to the flare point FP and its associated throat height (TH).

Collectively, one could also define the flare point FP and its associated throat height TH with the back edge 2602 of the mask 4302 along with a coplanar sensor 4343 and a write head ELG material 4304 using variations in the shape of mask 4302.

Figure 45:
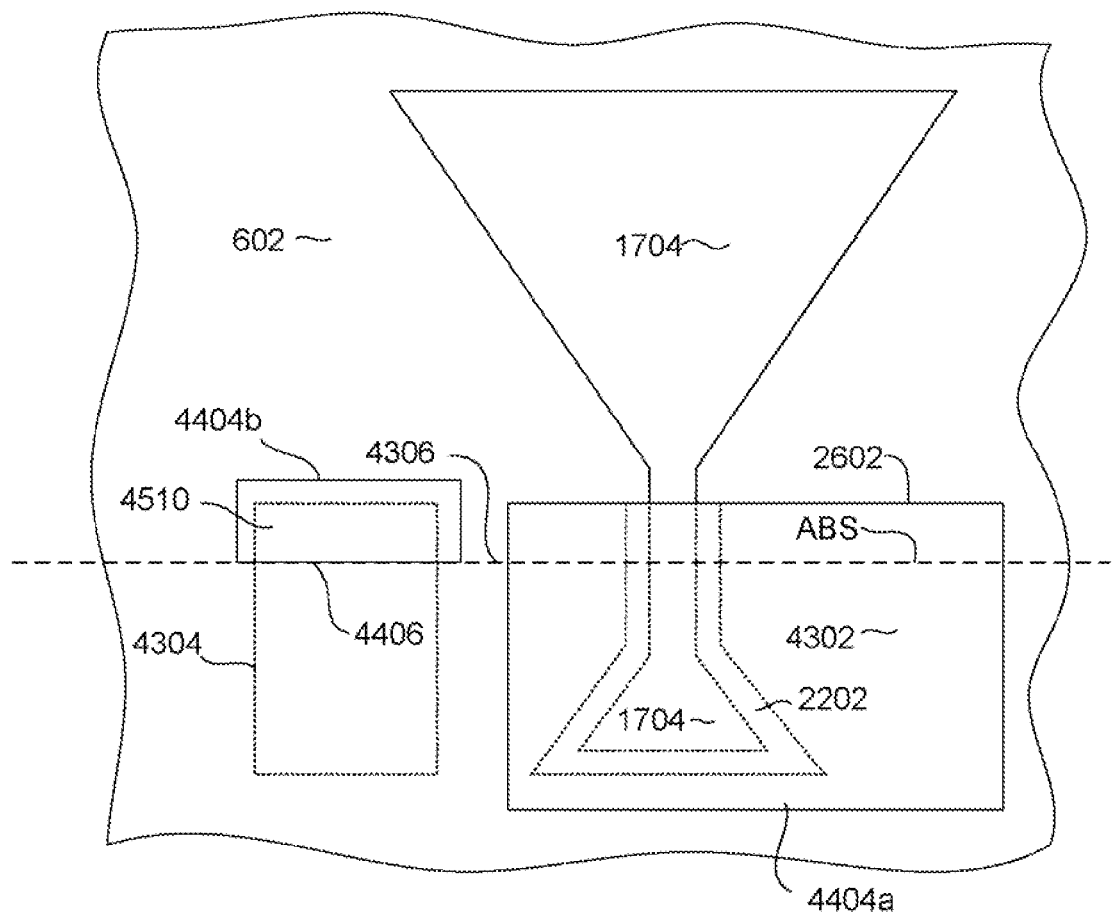
Figure 46:
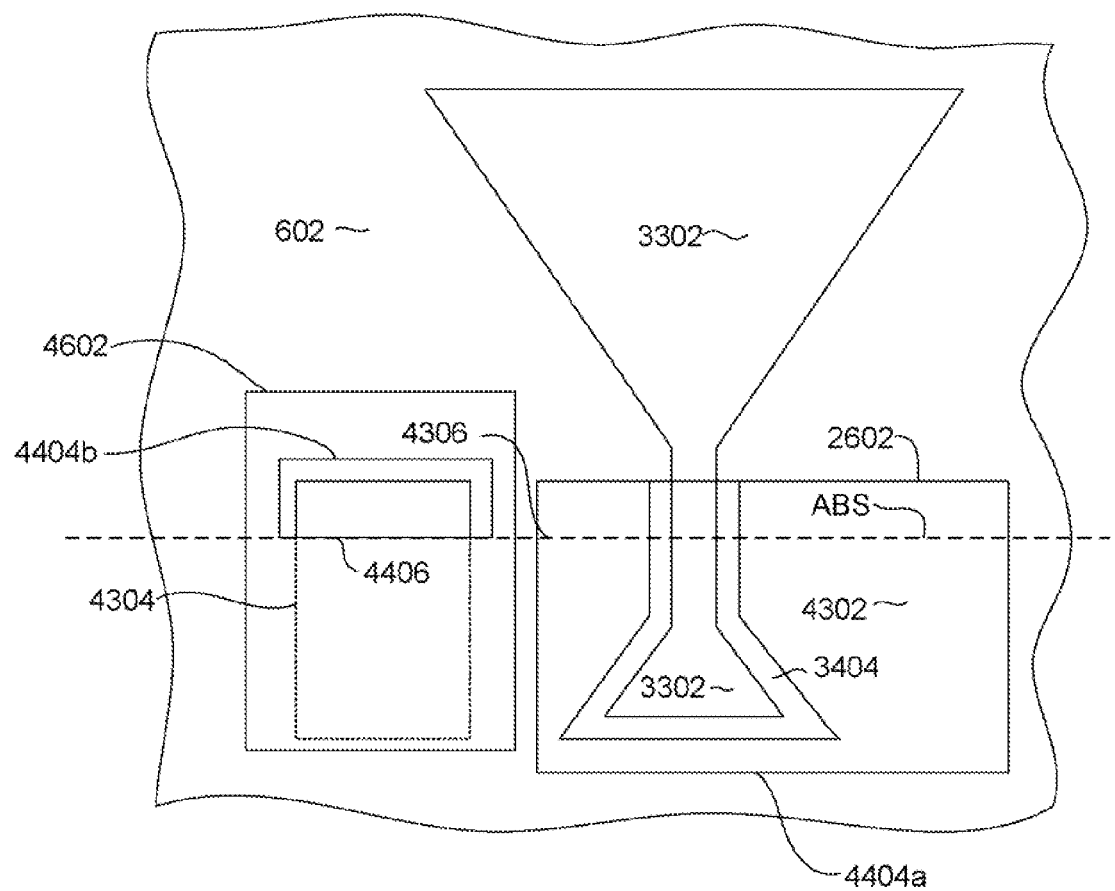
Figure 47:
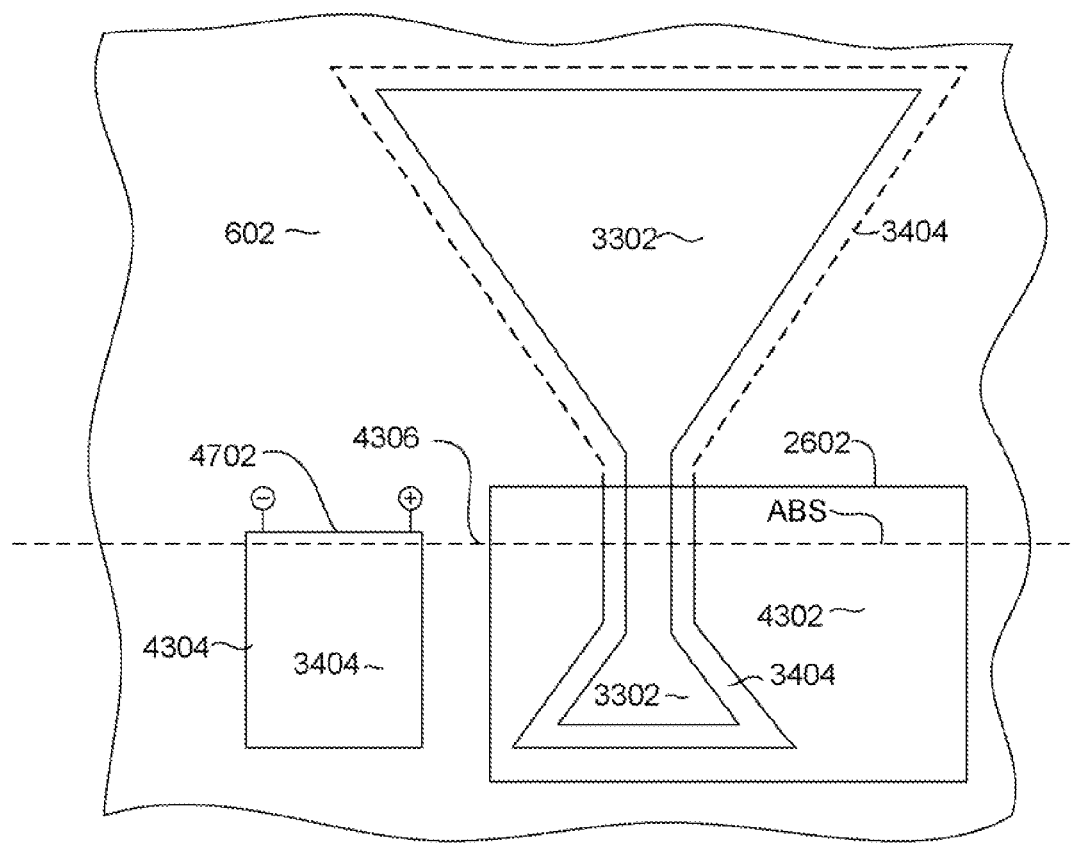

With reference now to FIG. 45, another method for constructing a lapping includes depositing an electrically conductive lapping guide material 4304 such as Au. Then, a mask structure can be formed that includes a first portion 4404a having a back edge 2602 located to define a flare point FP2 and its associated shield throat height TH as described above. The mask also includes a portion 4404b that has a front edge 4406 located to define a back edge of a lapping guide, which may or may not be co-linear with the ABS plane. Then, with reference to FIG. 46, an etchable material 4602 such as CoFe can be plated onto the lapping guide material 4304 adjacent to the mask 4404b. Although the etchable material 4602 is shown only over the lapping guide region in FIG. 46, this is for purposes of illustration only. The etchable material 4602 could actually be deposited full film, as it will be later removed by etching. Then, the mask portion 4404b can be removed leaving a non-plated portion 4510 on the lapping material 4304. Then, etching the non-plated portion 4510 creates the back edge of the write bead ELG. The plated material 3404 that was electroplated on the ELG material 4304, as well as the ELG material 3404 itself, collectively form an ELG that has aback edge 4702, as seen in FIG. 47. Since the mask structures 4404a and 4404b are defined in the same photolithographic step, the edge 4702 can be accurately aligned with the ABS plane, flare point FP2 and shield throat height TH, which is defined by the placement of the edge 2602. Similarly, the ELG 4304 would be electrically connected to enable monitoring the ABS plane by inferring resistance changes in the ELG 4304. This would create a resistance measurement that would relate the ABS plane to the back edge 4702 of the ELG 4304.

Figure 48:
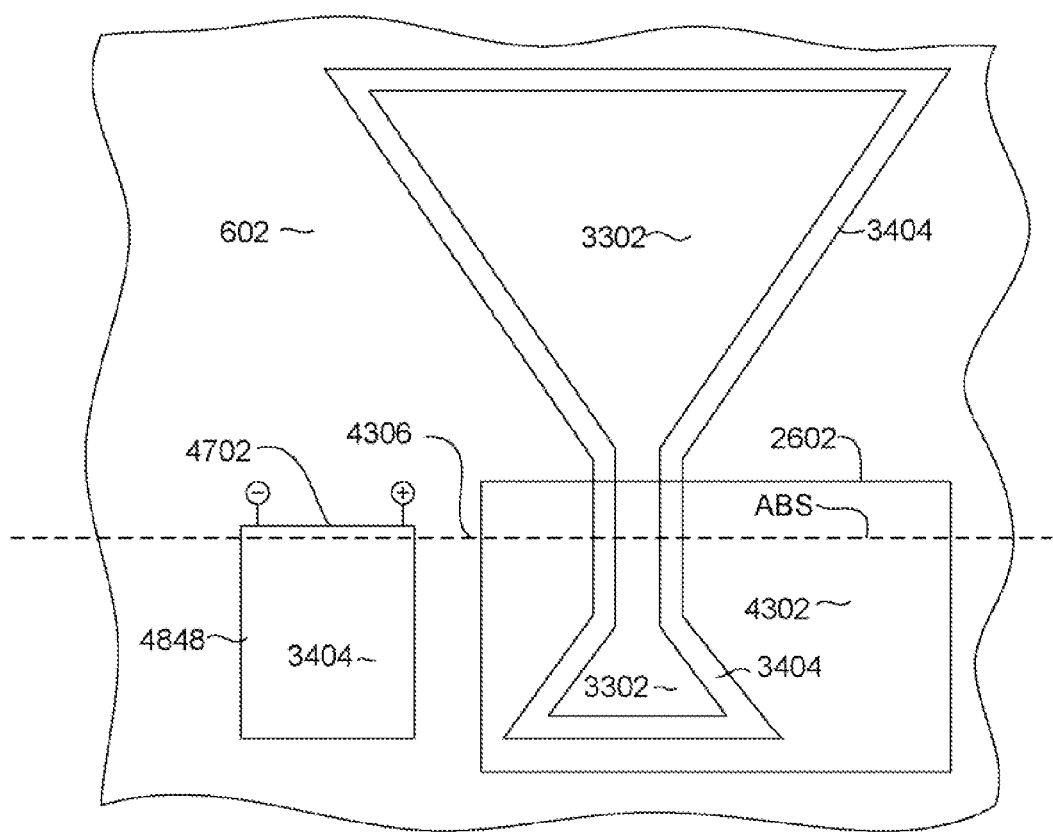

Furthermore, as seen in FIG. 48, a similar additive process could have a plated material 3404 on a sensor 4848 where the back edge 4802 of the sensor was created with part of the same mask 4302 that defined the flare point FP and its associated throat height TH.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head formed on a slider for magnetic data recording, comprising:
   a magnetic write head formed on the slider, the write head comprising:
      a magnetic write pole core portion having an end terminating at an air bearing surface and having a trailing edge surface and first and second sides;
      a magnetic write pole shell portion contacting and surrounding a portion of the trailing edge surface and first and second sides of the magnetic write pole core portion and terminating at an end surface disposed at a first distance from the air bearing surface;
      a non-magnetic spacer layer surrounding a portion of the magnetic write pole shell portion, the non-magnetic spacer layer having an end surface disposed at a second distance from the air bearing surface, the second distance being greater than the first distance; and
   a magnetic trailing shield disposed at the air bearing surface, the magnetic trailing shield partially surrounding the magnetic write pole core portion and being separated from the magnetic write pole core portion and the magnetic write pole shell portion by a non-magnetic gap layer.

2. A magnetic write head as in claim 1 wherein the magnetic write pole shell portion covers the trailing edge surface of said magnetic write pole core portion in a region recessed from the air bearing surface.

3. A magnetic write head as in claim 1 wherein magnetic write pole shell portion covers the side of said magnetic write pole core portion in a region recessed from the air bearing surface.

4. A magnetic write head as in claim 1 wherein the magnetic write pole shell portion covers the first and second sides and trailing edge surface of said magnetic write pole core portion in a region recessed from the air bearing surface.

5. A magnetic write head as in claim 1 wherein the magnetic write pole core portion has an axis along a length of the magnetic write pole core portion, and wherein the magnetic write pole shell portion is symmetrical about the axis.

6. A magnetic write head as in claim 1 wherein the magnetic write pole core portion is a laminated structure including layers of magnetic material separated by thin non-magnetic layers, and wherein the magnetic write pole shell portion is a magnetic metal electroplated over the magnetic write pole core portion.

7. A magnetic write head as in claim 1 wherein the magnetic write pole shell portion forms a stepped flare structure.

8. A magnetic write head as in claim 1 wherein the magnetic write pole core portion has a first flare point located a distance FP1 from the air bearing surface, and wherein the end surface of the magnetic write pole shell portion defines a secondary flare point located a distance FP2, FP2 being less than FP1.

9. A magnetic write head as in claim 1, wherein the magnetic write pole core portion is a laminated structure including layers of magnetic material separated by thin layers of non-magnetic material, and wherein the magnetic write pole shell portion comprises electroplated CoFe.

10. A magnetic write head as in claim 1, wherein the magnetic write pole core portion is a laminated structure including layers of magnetic material separated by thin layers of non-magnetic material, and wherein the magnetic write pole shell portion comprises electroplated NiFe.

11. A magnetic write head as in claim 1 wherein the magnetic write pole shell portion is laterally symmetrical.

12. A data storage device as in claim 11 wherein a first and a second back edge of the magnetic trailing shield are separated from the magnetic write pole core portion, magnetic write pole shell portion and non-magnetic spacer layer by a conformal non-magnetic gap layer.

13. A data storage device as in claim 11 wherein a first back edge of the magnetic trailing shield is located adjacent to the magnetic write pole shell portion and a second back edge is located adjacent to the non-magnetic spacer layer.

14. A data storage device, comprising:
 a housing;
 a magnetic disk rotatably mounted within the housing;
 a suspension;
 a slider connected with the suspension;
 an actuator connected with the suspension for the slider relative to a surface of the magnetic disk; and
 a magnetic write head formed on the slider, the write head comprising:
  a magnetic write pole core portion having an end terminating at an air bearing surface and having a trailing edge surface and first and second sides;
  a magnetic write pole shell portion contacting and surrounding a portion of the trailing edge surface and first and second sides of the magnetic write pole core portion and terminating at an end surface disposed at a first distance from the air bearing surface;
  a non-magnetic spacer layer surrounding a portion of the magnetic write pole shell portion, the non-magnetic spacer layer having an end surface disposed at a second distance from the air bearing surface, the second distance being greater than the first distance; and
  a magnetic trailing shield disposed at the air bearing surface, the trailing shield partially surrounding the magnetic write pole core portion and being separated from the magnetic write pole core portion and the magnetic write pole shell portion by a non-magnetic gap layer.

* * * * *